US010586369B1

(12) United States Patent
Roche et al.

(10) Patent No.: US 10,586,369 B1
(45) Date of Patent: Mar. 10, 2020

(54) USING DIALOG AND CONTEXTUAL DATA OF A VIRTUAL REALITY ENVIRONMENT TO CREATE METADATA TO DRIVE AVATAR ANIMATION

(71) Applicant: Amazon Technologies, Inc., Seattle, WA (US)

(72) Inventors: Kyle Michael Roche, Mercer Island, WA (US); David Chiapperino, Seattle, WA (US); Christine Morten, Long Beach, CA (US); Kathleen Alison Curry, Tujunga, CA (US); Leo Chan, Bowen Island (CA)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/885,369

(22) Filed: Jan. 31, 2018

(51) Int. Cl.
*G06T 13/20* (2011.01)
*G10L 15/26* (2006.01)
*G10L 13/08* (2013.01)
*G10L 13/04* (2013.01)
*G06F 17/27* (2006.01)
*G06T 13/40* (2011.01)
(Continued)

(52) U.S. Cl.
CPC ........ *G06T 13/205* (2013.01); *G06F 17/2785* (2013.01); *G06T 13/40* (2013.01); *G10L 13/043* (2013.01); *G10L 13/08* (2013.01); *G10L 15/265* (2013.01); *G06F 16/3344* (2019.01); *G06F 16/38* (2019.01); *G06T 2213/04* (2013.01); *G06T 2213/08* (2013.01)

(58) Field of Classification Search
None
See application file for complete search history.

(56) References Cited

U.S. PATENT DOCUMENTS 5,963,217 A * 10/1999 Grayson ............... G06T 13/205
345/473
6,570,555 B1 * 5/2003 Prevost .................... G06F 3/01
345/156
(Continued)

OTHER PUBLICATIONS

Office Action for U.S. Appl. No. 15/885,525, dated Mar. 25, 2019, Roche et al., "Using Dialog and Contextual Data of a Virtual Reality Environment to Create Metadata to Drive Animation for Multiple Avatars", 35 pages.
(Continued)

*Primary Examiner* — Jason A Pringle-Parker
(74) *Attorney, Agent, or Firm* — Lee & Hayes, P.C.

(57) ABSTRACT

One or more services may generate audio data and animations of an avatar based on input text. A speech input ingestion (SII) service may identify tags of objects in a virtual environment and associate tags of those objects with words in the input text, which may be stored as metadata in speech markup data. This association may enable an animation service to generate gestures toward objects while animating an avatar, or may be used to create animations or effects of the object. The SII service may analyze input text to identify dialog including multiple speakers associated with the text. The SII service may create metadata to associate certain words with respective speakers (avatars) of those words, which may be processed by the animation service to animate multiple avatars speaking the dialog.

20 Claims, 19 Drawing Sheets

(51) Int. Cl.
*G06F 16/38* (2019.01)
*G06F 16/33* (2019.01)

(56) References Cited

U.S. PATENT DOCUMENTS

| | | | | |
|---|---|---|---|---|
| 6,910,186 | B2* | 6/2005 | Kim | G06Q 10/107 715/706 |
| 7,076,430 | B1 | 7/2006 | Cosatto et al. | |
| 7,890,534 | B2* | 2/2011 | Bathiche | G06F 17/2264 707/791 |
| 9,299,178 | B2* | 3/2016 | Bokor | G06T 13/40 |
| 2001/0019330 | A1* | 9/2001 | Bickmore | G06T 13/40 345/473 |
| 2002/0089504 | A1* | 7/2002 | Merrick | G06F 3/0481 345/473 |
| 2002/0127525 | A1* | 9/2002 | Arington | G09B 7/04 434/262 |
| 2004/0179037 | A1* | 9/2004 | Blattner | G06T 13/40 715/751 |
| 2008/0091692 | A1* | 4/2008 | Keith | G06F 16/958 |
| 2008/0259085 | A1* | 10/2008 | Chen | G06T 13/205 345/473 |
| 2009/0029771 | A1* | 1/2009 | Donahue | A63F 13/10 463/31 |
| 2009/0150802 | A1* | 6/2009 | Do | G06F 3/011 715/757 |
| 2013/0073957 | A1* | 3/2013 | DiGiantomasso | G06Q 50/20 715/705 |
| 2013/0151955 | A1* | 6/2013 | Williams | G06F 17/24 715/255 |
| 2013/0173531 | A1* | 7/2013 | Rinearson | G06Q 30/02 707/608 |
| 2014/0006030 | A1* | 1/2014 | Fleizach | G06F 3/167 704/260 |
| 2014/0007257 | A1* | 1/2014 | Dougherty | G09B 5/062 726/28 |
| 2015/0287403 | A1 | 10/2015 | Holzer Zaslansky et al. | |
| 2016/0203827 | A1 | 7/2016 | Leff et al. | |
| 2017/0309309 | A1* | 10/2017 | Kaldma | G06F 3/04817 |

OTHER PUBLICATIONS

Office Action for U.S. Appl. No. 15/885,525, dated Jul. 3, 2019, Roche, "Using Dialog and Contextual Data of a Virtual Reality Environment to Create Metadata to Drive Animation for Multiple Avatars", 40 pages.

* cited by examiner

USING DIALOG AND CONTEXTUAL DATA OF A VIRTUAL REALITY ENVIRONMENT TO CREATE METADATA TO DRIVE AVATAR ANIMATION

BACKGROUND

Some software applications create virtual and/or physical objects in a Virtual Reality (VR) environment or an Augmented Reality (AR) environment, which may accommodate user interaction. For instance, some VR applications may allow users to watch animated avatars, play games, or interact with virtual objects in other three-dimensional graphical environments. Some of these applications may also provide an Augmented Reality (AR) environment in which a user view or interact with animated avatars and/or physical objects located in the actual environment, as well as virtual objects depicted within the three-dimensional graphical environment.

Developing a VR/AR application can be challenging and time consuming. For example, developers have to create programming code for receiving and processing data received from different input devices, as well as developing programming code for animating avatars and creating objects in the environment. In addition to processing the input received from the different devices, it can be difficult and time consuming for a developer to create customized, realistic, and natural looking animations for avatars a virtual environment. For instance, the developer often has to specify different graphical models to include in the environment, define the layout of the environment, and create customized animations of an avatar to make the avatars appear engaging within the environment.

DETAILED DESCRIPTION

Figure 1:
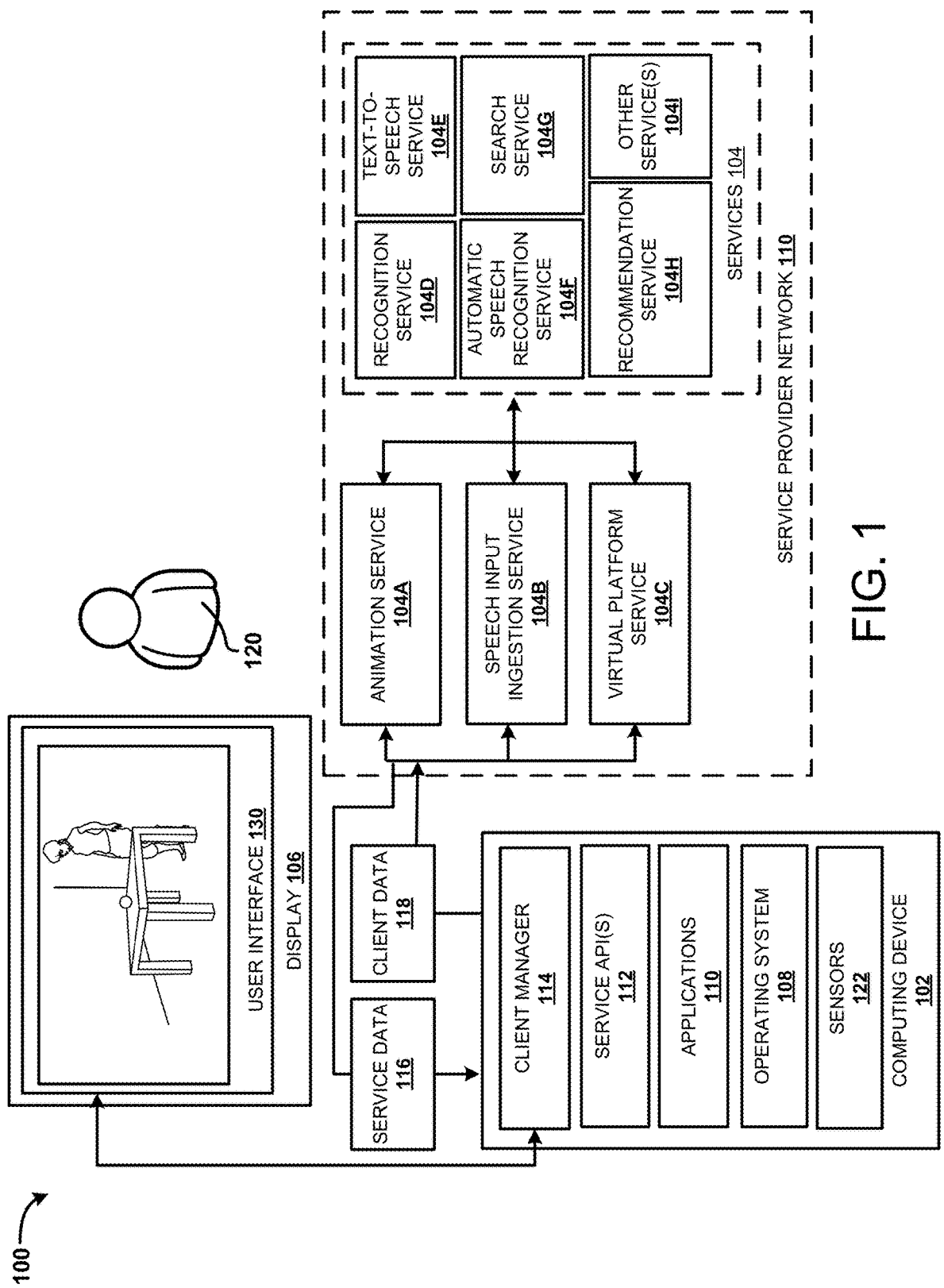
FIG. 1 is a block diagram depicting an illustrative operating environment in which a VR/AR application utilizes different services of a service provider network.

The following detailed description is directed to technologies for a framework that provides Virtual Reality (VR) applications and/or Augmented Reality (AR) applications (hereinafter may be collectively referred to as a "VR/AR application") to access to different services. Instead of a developer of the VR/AR application having to develop programming code to implement features provided by one or more services, the developer may utilize functionality of existing services that are available from a service provider network. For example, a VR/AR application can be configured to utilize one or more of graphical recognition services, automatic speech recognition (ASR) services, text-to-speech (TTS) services, search services, context services and the like. In some examples, the VR/AR application can utilize other services, such as virtual platform services, speech input ingestion services, and animation services.

A speech input ingestion service may create, modify, or otherwise supplement speech markup data (SMD) with metadata, which can be used for further processing of the SMD, such as by the animation service. Text may be input into the system and used to create the SMD, which in turn may be used to create animations of one or more avatars that interact in a virtual environment. The text may be used to create audio data, which may be synchronized during playback with the animations to output avatars that speak the text and move in a natural way, while possibly engaging or gesturing toward objects and/or other avatars in the virtual environment. As an example, the input text may include: "I am going to eat that apple." A virtual environment may be created and defined by the virtual platform to include the avatar, an object_apple, and possibly other objects. The object_apple may be tagged with metadata that indicates that the object (i.e., the apple) is an "apple." Additional tags or other tags may be used such as "fruit", "red", "food", and so forth. During creation of the SMD, the word "apple" may be associated with the tag "apple". The speech input ingestion service may create metadata that associates the word "apple" in the text with the object "object_apple", which may be an object identifier. Example SMD may include: "I am going to eat that apple" <object_apple, point>. In this example, the word "apple" is associated with an object identifier "object_apple" and an action or gesture of "point", which may cause an animation service to create animate an avatar to point at the apple. Other actions, gestures, and/or effects may be included. In some embodiments, other information may be associated in the metadata, such as a current location of the object in the virtual environment (e.g., actual coordinates of a location of the object, spatial offset values for relative locations, etc.). Groups of items may be tagged and interacted with in a similar way. During creation of the animation using the SMD, the animation service may create an animated gesture to cause the avatar to look at the apple or otherwise interact with the apple while speaking "I am going to eat that apple."

In some embodiments, the input text may include text to be spoken by multiple avatars. For example, the text may include text from a play that include multiple speakers. The speech input ingestion service may analyze the text to identify speakers (avatars) to be associated with certain words in the text. For example, the text may include first words associated with a first speaker (first avatar) and second words associated with a second speaker (second avatar). Any number of speakers may be represented in the input text, which is not necessarily limited to only two speakers (not limited to two avatars). The speech input ingestion service may create metadata and/or otherwise label words in the input text for use in generating different audio and/or animations for different avatars. The avatars may be selected based on available avatars in a virtual environment, received user input, based on historical data, randomly selected, and/or selected in other ways to associate an avatar with words for a specific speaker. The first words may be parsed and processed by a text-to-speech service to create first audio data for the first avatar while the second words may be parsed and processed by a text-to-speech service to create second audio data for the second avatar. First animations may be generated for the first avatar, which may include animations of the avatar speaking words, but may include other animations, such as animations of the avatar listening (and responding) to another avatar and/or interacting with or gesturing toward an object (possibly another avatar).

In various embodiments, the text may indicate effects associated with objects in the virtual environment and/or objects in the real world environment (e.g., Internet of Things (IoT) and/or other devices capable of exchanging data with the various services and/or devices described herein, such as via wireless signals. The effects may include animations associated with virtual objects, such as movement of those objects and/or operation of the objects (e.g., output of light, sounds, etc.). For example, input text may include "I am turning on the lights." The services described herein may create animations to show an avatar interact with a virtual light switch in the virtual environment and then depict a light changing from a state of "off" to a state of "on" by creating visual effects to show the same. When configured, the input text may cause a real world light to turn on or may control other real world devices such as haptic devices, sound producing devices, air movement devices (e.g., fans, mist devices, etc.), vibration devices for haptic feedback, and/or other real world devices, possibly via transmission of wireless signals. The speech input ingestion service may analyze the input text to determine virtual objects and/or real world objects that may be candidates for animation or other effects. The speech input ingestion service may create metadata and/or include information in the SMD to initiate the object animations and/or effects, such as in coordination with animation and speech associated with words that indicate the object animation and/or effect. In the example above, the SMD may be modified as shown in the following example: "I am turning on the"<touch switch>"lights"<light_1, on, light 2, on>.

The input text may include explicit words to enable association of tags, speakers, and/or real world objects (e.g., IoT devices, etc.). However, in some instances, contextual information may be used to create these associations. For example when turning on a light, the context may suggest that a tag "light switch" is relevant to the phrase "turning on a light". Other contextual information may be used, which may aggregated based on machine learning algorithms and/or historical data, as discussed herein.

An animation service can be configured to provide animation of one or more avatars. The animations may be used by one or more services and/or VR/AR applications to introduce objects to users, to provide a virtual concierge, to provide a host, for entertainment and/or for other reasons. The animation service may enable a user to generate an avatar that speaks words chosen by the user, and performs compelling animations and gestures while speaking those chosen words. The avatars may be linked to other sites, downloaded and executed in different environments, and/or shared in other ways. As discussed herein, the term "avatar" refers to an animated character that is generated based on predefined inputs such as text or code that drives creation of the avatar and animation of the avatar, and may or may not include animated characters that are animated based on real-time or near-real time input by a user via a user device (e.g., input via a gaming controller, etc.). Thus, the avatars may be generated and animated using predefined inputs that do not directly specify movements for animation.

In some examples, the animation service may receive input text to be spoken by an avatar. The text may be processed using a text-to-speech service, which may be performed locally, remote, or a combination of both, to generate audio data of the text. The audio data may be configured for playback to create sound of a person speaking the text. Speech markup data (SMD) may include information to enable animation of an avatar and audio data based on text. The SMD may include speech synthesis markup language (SSML) or may include other formats of text that can be used to create animations, audio data, and other information discussed herein, including metadata that may provide supplemental and/or ancillary information.

The SMD may be created from input text, which may be practically any text input or feed to the system. The SMD may include the sentences of the text, words of the text and/or phonic symbols of the text, which may each include time codes that indicate a time of playback of a respective element of the audio data (e.g., playback of a particular sound at a certain time, etc.). The SMD may include other information, such as emotion values and/or other information to influence or describe sounds and attributes of the audio data. As discussed herein, the term "phonic symbols" may include phenomes and/or other symbols used to represent distinct sounds which may be associated with respective imagery and/or animation movement, referred to as "visemes". Some phonic symbols may be associated with a same viseme. For example, the sounds for "ch" and "sh" may be represented by different letters, but may be associated with same phonic symbols and visemes.

The animation service may receive the SMD, which may be processed to create animations for an avatar. For example, the animation service may generate first animation sequences of a mouth of the avatar based at least in part on the phonic symbols and the different time codes associated with each phonic symbol. The animation service may generate second animation sequences of skeletal components of the avatar based at least in part on the words and the different time codes associated with each word or combinations of words. The skeletal components may include a torso, legs, arms, hands, fingers, and/or other body parts that may move to perform gestures and/or animations. The animation service may determine animations based on selected words, which may be associated with animation sequences or gestures. The animation service may generate combined animation sequences of the avatar that include the first animation sequences the second animation sequences.

The animation service may be designed to interact with one or more users and/or interact with the virtual environment presented by the VR/AR application. The animation service may generate animations that cause the avatar to interact with objects within a virtual environment, appear to interact with objects in the real world (e.g., look at a person or object identified at a specific location in the real world via image capture from one or more cameras, etc.), or both. In some examples, the animation service may receive input signals that indicate objects and locations (e.g., coordinates) of the objects in the real world. Recognition services may be used to create tags for the objects and/or determine locations/coordinates that locate the objects/people relative to the display or some other reference point. The animation service may generate an animation sequence to depict the avatar looking at an object or person in the real world based on the input signals.

The different services utilized by a VR/AR application can be identified during runtime and/or can be preconfigured for use with the VR/AR application. For instance, the VR/AR application can be configured to identify applications and/or services that are relevant to a context associated with a user interacting with the virtual environment. As used herein, the term "relevant" may refer to an application or service that provides data and/or functionality that is applicable to the current context. The term "context" may refer to the background, environment, framework, setting or situation that surrounds a particular event or situation. Context data might include speech data, gesture data, location data, movement data, activity data, user data, time data, and the like. Some of the context data might be determined from sensors associated with a computing device. For example, the sensors of a computing device associated with a user might be used to determine a speed of the computing device, a location of the computing device, weather conditions, lighting conditions, sound near the user or at other locations within an environment, facial expressions of the user (or some other individual), gestures performed by the user (or some other individual) and the like. The context data might also include data relating to a current activity. For example, a current activity might relate to a user performing some action within the virtual environment (e.g., browsing items within an online store, moving within a virtual environment, performing a search, and the like).

As other non-exhaustive examples, context data can include any information about: location (such as obtained from global positioning systems (GPS), Bluetooth®, radio frequency (RF) signals, or any other applicable location sensor), time, date, what application the user is using, what features the user is using on a particular application, physical or virtual environment (such as temperature, altitude, humidity, biometric pressure, etc.) device orientation, the proximity of other devices with relevant data (such as a beacon or friend with a suitable device), the proximity of other users, biometric data (such as pulse, heart rate variability, blood oxygenation, body temperature, blood sugar, sleep, what the user is viewing), and the like. The context data can be associated with users in a physical environment and/or in a virtual environment.

Software developers may develop VR/AR applications using an Integrated Development Environment ("IDE") (discussed in more detail below) and/or a software developer toolkit ("SDK") that may include one or more APIs that specify functionality for connecting the VR/AR application to different services or other tools that might be used by a software developer to develop a VR/AR application. For example, an API may be used to define one or more custom events, send a message to another application and/or service, request to receive context data from a computing device, and the like. The SDK and/or API might also be utilized to change the operation of the operating system and/or some other application. For instance, one part of the operating system might utilize the API to communicate with another part of the operating system in response to receiving certain data.

In some examples, one or more of the services may utilize one or more machine learning algorithms to create, refine, and/or improve data provided to the VR/AR application. For instance, over time as a service receives more data, the data provided by the service may change based on the data that is received. The machine learning algorithm(s) may be refined in response to receiving additional data. Additional details regarding the various components and processes described above for selecting and utilizing applications based on context will be presented below with regard to the following figures.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances and the like. As mentioned briefly above, the examples described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific examples or examples. The drawings herein are not drawn to scale. Like numerals represent like elements throughout the several figures (which may be referred to herein as a "FIG." or "FIGS.").

Referring now to FIG. 1, an operating environment 100 is illustrated in which a VR/AR application utilizes different services of a service provider network 110, according to various examples presented herein. The operating environment 100 shown in FIG. 1 includes computing device 102, services 104, and display 106. According to some configurations, the computing device 102 may be configured as a tablet computing device, a smart phone, a personal computer ("PC"), a desktop computer, a laptop computer, a notebook computer, other mobile computing devices, a video game system, a set-top box, a smart television, or the like. According to other examples, at least a portion of the functionality of the computing device 102 may be provided by the one or more services 104, or a service provider network 110 (See the service provider network 110 illustrated in FIG. 12). As illustrated, the services 104 include an animation service 104A, a speech input ingestion service 104B, a virtual platform service 104C, a recognition service 104D, a text-to-speech (TTS) service 104E, an automatic speech recognition (ASR) service 104F, a search service 104G, a recommendation service 104H, and one or more other services 104I, such as a context service. In other configurations, fewer or more services can be provided by the service provider network 110, or some other network.

The services 104 or the service provider network 110 may include one or more application servers, Web servers, data storage systems, network appliances, dedicated hardware devices, and/or other server computers or computing devices for providing the functionality of the different services. In these examples, the computing device 102 can include minimal hardware for connection to a network-based computing platform via a network. The computing device 102 may communicate via the network to access various services or computing resources described herein. For example, the computing device 102 can access the animation service 104A and/or other available services. More details regarding the operation of the services 104 are provided below.

The computing device 102 can be configured to execute an operating system 108, applications 110, service API(s) 112, client manager 114, as well as other application programs or components. The applications 110 might include one or more VR/AR applications, Web browser applications, productivity applications (e.g., word processing, spreadsheet, and/or presentation applications), travel applications, fitness applications, restaurant applications, social network applications, or any other applications. The term "application" may refer to any set of program instructions or data a processor reads to perform some task or operation. In some examples, an application may be part of the system software (e.g., the operating system) or might be application software (e.g., end-user programs).

In some examples, one or more of the applications 110 may be configured to utilize one or more of the service APIs 112. According to some configurations, the applications 110 might be part of the operating system 108 and/or some other component. It should be understood that the computing device 102, as well as other computing devices, may be identically configured or may have more or fewer application programs and/or components that are illustrated for the computing device 102.

Input to the applications 110 may be provided via one or more input devices that are connected to or otherwise are in communication with the computing device 102. For example, computing device 110 can receive input from sensors 122. Input to the applications 110 can be used to control aspects of the application 110, such as navigating menus. The computing device 102 may also be configured to present the visual content provided by one or more applications 110 on one or more display devices that are built-in to or are external to and in communication with the computing device 102, such as a display 106.

The display 106 is an output device configured to present information in a visual form. In particular, the display 106 may present visual content provided by one or more of the services 104, the client manager 114, an application 110, and the like. The visual content might include a display of three dimensional graphical models presented in a virtual environment, graphical user interface (GUI) elements, text, images, video, notifications, virtual buttons, virtual keyboards, messaging data, Internet content, device status, time, date, calendar data, preferences, map information, location information, and any other information that is capable of being presented in a visual form. In some examples, the display 106 is a liquid crystal display (LCD) utilizing any active or passive matrix technology and any backlighting technology (if used). In other examples, the display 106 may be an organic light emitting diode (OLED) display. According to some configurations, the display 106 may be a display (e.g., a head-mounted display or some other type of virtual reality headset) configured to present three-dimensional depictions to the user 120. Other display types are contemplated. In addition, the display 106 can include an input device such as a touchscreen or multi-touch enabled touchscreen.

All or a portion of the applications 110 may utilize a service API 112 to interact with one or more of the services 104. As discussed above, the applications 110 might be any instructions or data that provide one or more functions. The applications 110 may be configured to call one or more methods exposed by the service APIs 112 to access one or more of the services 104 via a network to take advantage of one or more of the features provided by the relevant service 104. For example, a service API 112 may be used by one or more of the applications 110 and/or services 104 to register to receive notifications, and possibly be activated, in response to data received by another application 110 and/or service. The service API 112 might also be used to send data to another application 114, request data, and the like.

A user 120 may interact with the applications 110 and/or services 104 using the computing device 102. In some examples, the UI 130 that is displayed on the display 106 may be used to view and interact with service data 116 received from one or more of the services 104. According to some configurations, the service data 116 provides graphical data for use in display of a virtual environment.

As illustrated, a client manager 114 can be configured to manage one or more sessions during which a computing device, such as the computing device 102, interacts with at least a portion of the services 104 via an AR/VR application 110. The service 104 may support connections to any number of computing devices 102 so that one or more users utilizing the various computing devices 102 can share data with the services 104, and possibly with one another. As such, the illustrated example is merely illustrative, and should not be construed as being limiting in any way.

As illustrated, rather than a developer of a VR/AR application 110 having to program functionality directly within the VR/AR application, the developer may utilize functionality provided by one or more of the services 104. In some examples, the client manager 114 is configured to monitor information associated with the user and to provide client data 118 to one or more of the services 104. In some cases, the data 118 is provided to the service 104 when a network connection is established between the computing device 102 and a remote computing device that is part of the service 104. The client data 118 may include data received from one or more of the sensors 122, data received from one or more of the applications 110, and the like. For example, the client data 118 may include speech data, camera data, and the like. In some configurations, one or more of the services 104 requests data from the client manager 114 and/or from the AR/VR application 110.

As discussed above, the services 104 can interact with the client manager 112 and/or the AR/VR application 110. For example, in some examples, the animation service 104A and/or other services are configured to provide different services when developing a virtual environment as well as when the user 120 is interacting with a virtual environment. Generally, the animation service 104A interacts with other services 104 of the service provider network.

According to some configurations, the recognition service 104D is configured to provide support for image analysis for object and scene detection. Using the recognition service 104D, objects, scenes, faces can be detected within graphical data. For instance, individuals can be identified within an image, scenes (e.g. sunsets, beaches, offices, . . . ). The graphical data utilized by the recognition service 104D can be client data 118 received from the computing device 102 and/or graphical data received from some other source, such as a service 104. According to some examples, the recognition service 104D exposes an API that allows a developer of the VR/AR application to add deep learning-based visual search and image classification to one or more applications. One example of a recognition service that can be utilized includes, but is not limited to the AMAZON REKOGNITION service, available from Amazon, Inc.

In some examples, the recognition service 104D utilizes highly scalable, deep learning technology to analyze digital data, such as graphical images. The recognition service 104D can use these deep neural network models to detect and tag (i.e. label) objects and scenes in the graphical data. This tagging can save a developer a large amount of time. For example, graphical models added to a virtual environment via the virtual platform service 104C can be automatically tagged. The tagging performed by the recognition service 104D allows a virtual environment to be searchable such that models and objects can be readily discoverable. The tags created by the recognition service 104D may be searched and/or associated with words, and thus used to create animations of avatars as further discussed below. In various embodiments, the recognition service 104D may analyze a collection of items and tag the items as a group. For example, a virtual environment may include a desk, a chair, and a file cabinet, which may be recognized by the recognition service 104D as an office, and tagged accordingly with one or more tags.

The recognition service 104D can also be used to identify a user, such as user 120. For example, the recognition service 104D is configured to obtain an image of the user 120 and compare the image to one or more reference images that can be used to identify the user. This allows a VR/AR application 110 to identify and confirm identities of users.

In some configurations, the recognition service 104D can also be utilized to detect emotions such as happy, sad, or surprise, and demographic information such as gender from facial images. For example, the recognition service 104D can analyze live images, and send the emotion attributes to the animation service 104A, the multi-modal disambiguation service 104B, the virtual platform service 104C, and/or other services 104.

In some examples, the recognition service 104D can be used to identify objects and scenes in an environment represented as graphical data. For example, a camera associated with computing device 102 can capture images of the environment and provide the images to the recognition service 104D for analysis. Is some configurations, the recognition service 104D locates faces within images and analyze face attributes, such as whether or not the face is smiling or the eyes are open. The recognition service 104D can tag a face with tags such as, but not limited to smiling, frowning, eyes are open/closed, happy/sad, female/male, and the like. The recognition service 104D can also be used for facial recognition to identify an individual depicted within the image.

The text-to-speech (TTS) service 104E is configured to provide speech output in response to receiving text input. The TTS service 104E turns text into lifelike speech, allowing a developer to include characters that talk. In some examples, the TTS service 104E provides lifelike voices across a variety of languages. A developer can select the desired voice and develop a speech-enabled VR/AR application that supports the languages of different countries. In some configurations, the voices provide by the TTS service 104E include male and female voices with a variety of accents. Utilizing the TTS service 104E, the developer specifies the text to be converted to speech via one of the service APIs 116 and the TTS service 104E returns the audio stream. In other examples, the text to be converted to speech can be provided by the client manager 114, an application 110, and/or from some other service 104.

The automatic speech recognition service 104F is configured to provide automatic speech recognition (ASR) functionality for converting speech to text, and to provide natural language understanding (NLU) to recognize the intent of the text. The ASR and NLU enable a developer to build VR/AR applications 110 with highly engaging user experiences and lifelike conversational interactions. In some configurations, the automatic speech recognition service 104F can be provided by AMAZON LEX, by Amazon, Inc. For example, a VR/AR application can be developed that allows a developer to quickly and easily build sophisticated, natural language, conversational bots (e.g., "chatbots"). As speech recognition and natural language understanding can be challenging to implement, the functionality of the automatic speech recognition service 104C can be implemented by a developer.

In some configurations, the ASR service 104F can utilize both text input as well as voice input to provide chat robots or "chatbots". These "chatbots" allow for highly engaging, conversational experiences, through voice and text, that can be customized and used on mobile devices, web browsers, and on chat platforms. The ASR service 104F utilizes deep learning technologies such as text-to-speech, automatic speech recognition, and natural language processing, to generate chatbots that simulate human conversation and dialogue. A developer can create a chatbot that responds to either voice or text in the language native to the user.

The search service 104G is configured to provide search functionality that can be utilized in developing a VR/AR application as well as using the VR/AR application. In some configurations, the search service 104G is configured to search for "tags" that are associated with different objects associated with one or more virtual environments. According to some examples, the search service 104G maintains the tags that are associated with the graphical models tagged by the recognition service 104D, and/or some other service. For example, the search service 104G may receive a query from the virtual platform service 104C for models that match criteria of the user 120. In response to receiving the query, the search service 104G provides an identification of the different graphical models that meet a search criteria provided by the user 120, an application 110, the client manager 114, and/or from some other service 104.

The recommendation service 104H is configured to provide recommendation functionality that can be utilized to generate recommendations of one or more graphical models that may be included within the virtual environment. In some configurations, the recommendation service 104H is configured to utilize data associated with one or more users 120 associated with the service provider network 110. The recommendation service 104H may access data that indicates acquisitions of one or more products ("free or paid") of one or more users of the service provider network, customer/user preference data, previous selections of one or more graphical models and/or products available from the service provider network or some other service), and the like. For example, when a user is interacting with the virtual platform service and requests to view "desks" for inclusion within a virtual environment, the recommendation service 104H may access data from the service provider network 110 that indicates one or more desks that have been previously purchased by the user, and/or one or more desks which the user indicated an interest in acquiring or obtaining additional information on. In some configurations, the search service 104G, or some other service 104, can provide data indicating what objects the user is searching for. For instance, the recommendation service 104H may receive data that indicates one or more "tags" for use in generating the recommendation. In response to receiving a request for recommendations, the recommendation service 104H provides an identification of the different graphical models that are recommended for a user 120.

In some configurations, an application 110 can utilize a service API to interact with the recognition service 104D, the TTS service 104E, the ASR service 104F, the search service 104G, and/or other services 104I. For example, an API operation may be used by a VR/AR application to identify an identity of an object or a user.

In some examples, software developers may develop applications 110 using a software developer toolkit ("SDK") and/or an Integrated Development Environment ("IDE"). An IDE provides comprehensive facilities to developers for software development. In some examples, an IDE includes a source code editor, build automation tools, and a debugger. In many cases, an IDE uses similar user interfaces such that the authoring, modifying, compiling, deploying and debugging software has a consistent look and feel. In some configurations, the IDE is provided by the service provider network 110. The SDK may include an application programming interface ("API"), such as the service API 112, that specifies functionality for connecting the VR/AR application 110 to a service 104 or other tools that might be used by a software developer to develop the VR/AR application 110.

According to some configurations, one or more of the services 104 may use a machine learning mechanism to improve the service data 116 provided by the service. The term "machine learning" may refer to one or more programs that learns from the data it receives. For example, a machine learning mechanism may build, modify or otherwise utilize a model that is created from example inputs and makes predictions or decisions using the model. The model may be trained using supervised and/or unsupervised learning. For instance, over time as a service receives more data, the data provided by the service may change based on actual usage data associated with users of the service that is received. The machine learning mechanism utilized by the service 104 may be refined in response to receiving additional data.

It should be understood that various implementations of the operating environment 100 include multiple networks, services 104, applications 110 and service APIs 112. As such, the illustrated operating environment 100 should be understood as being illustrative, and should not be construed as being limiting in any way.

Figure 2:
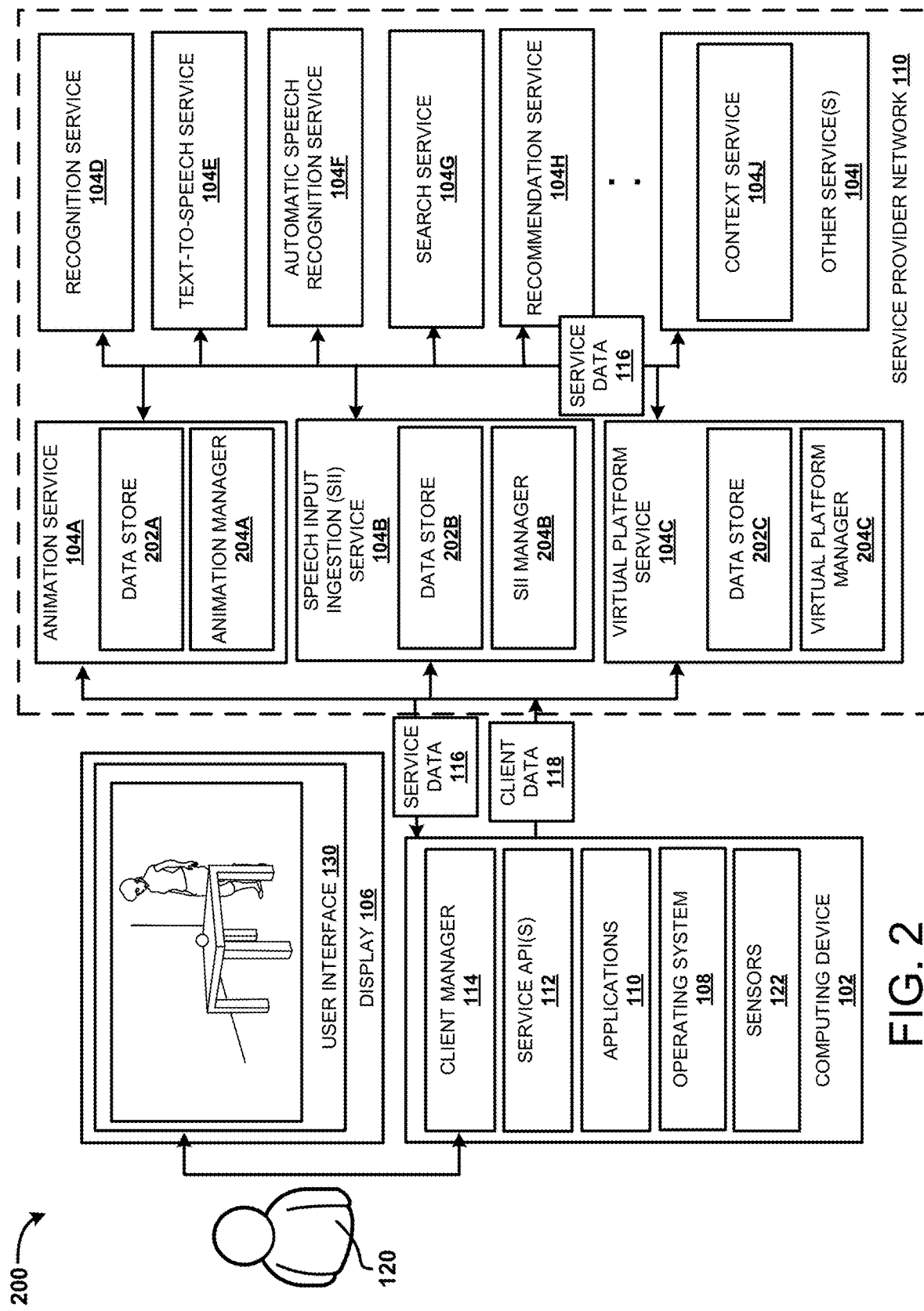
FIG. 2 is a block diagram depicting an illustrative operating environment in which different services interact within a service provider network to provide functionality to a VR/AR application.

Referring now to FIG. 2, an operating environment 200 is illustrated in which a VR/AR application utilizes different services of a service provider network 110, according to various examples presented herein. The operating environment 200 shown in FIG. 2 is similar to the operating environment shown in FIG. 1, but includes more details. As illustrated, the operating environment 200 includes data stores 202A-202C, an animation manager 204A, a speech input ingestion service 204B, a virtual platform manager 204C, and a context service 104J.

The animation service 104A can be configured to provide animation of one or more avatars. In some examples, an animation manager 204A may receive input text to be spoken by an avatar. For example, the input text may be provided by a user, a service 104, or may be sourced from other locations, such as from a written work. The input text may be stored in the data store 202A. The text may be processed using the text-to-speech service 104E and/or the ASR service 104F, which may be performed locally, remotely, or a combination of both, to generate audio data of the text. The audio data may configured for playback to create sounds of a person speaking the text. In various examples, different speaker attributes may be selected or employed to create different sound effects, such as a female voice, a male voice, a deep voice, a high pitched voice, and so forth. In addition to the audio data, speech markup data (SMD) may be created from the text by the text-to-speech service 104E and/or the ASR service 104F and stored in the data store 202A. The SMD may include the sentences of the text, words of the text and/or phonic symbols of the text, which may each include time codes that indicate a time of playback of a respective element of the audio data (e.g., playback of a particular sound at a certain time, etc.). In some examples, the text may be translated from a first language to a second language prior to or after processing by the text-to-speech processor 104E.

The animation manager 204A may receive the SMD, which may be processed to create animations for an avatar. For example, the animation manager 204A may generate first animation sequences of facial features, such as a mouth, of the avatar based at least in part on the phonic symbols and the different time codes associated with each phonic symbol. The animation manager 204A may generate second animation sequences of skeletal components of the avatar based at least in part on the words and the different time codes associated with each word or combinations of words. The skeletal components may include a torso, neck, head, legs, arms, hands, fingers, and/or other body parts that may move to perform gestures and/or animations. More details with regard to operation of the animation manager 204A are provided below.

The animations sequences may be stored in the data store 202A and may be associated with words, phonic symbols, idioms, and/or other data. The animation manager 204A may access select animation sequences based on the text and the SMD to be processed.

In some configurations, the animation manager 204A may receive or determine an emotion value associated with the text, and may use the emotion value (e.g., an parameter, weight, or other designator) to influence the animation sequence, movement, the standard pose, and/or other attributes of the animation. The emotion value may be a numeric value or a non-numeric value, such as a label (e.g., happy, sad, excited, etc.), or another designation. The emotion value may be received from the ASR service 104F, for example. The animation manager 204A may determine the emotion values when unpacking data from the ASR service 104F or another service that provides emotion values. For example, the ASR service 104F may include emotion values assigned via a look up table or other data repository, which may be assigned to individual words, phrases, idioms, sentences, and/or other portions of speech or entire speech. In various embodiments, the ASR service 104F may include emotion values associated with certain words. In some embodiments, the ASR service 104 may utilize machine learning algorithms to determine or generate emotion values. For example, a machine learning algorithm may analyze imagery of facial movements corresponding to actual spoken words to determine emotion values, possibly using training data and/or a feedback look to modify emotion values over time. The machine learning algorithm may analyze a context of words to determine emotional values for associated words, and may compare the determined emotional values to observation data obtained by analysis of real speakers, for example.

In accordance to some embodiments, the animation manager 204A may determine emotion values using the look up table, machine learning, and/or from other services without requiring the emotion values to be provided by the ASR service 104F. For example, the animation manager 204A may, at times, generate and/or apply an emotion value to modify animation of an avatar.

The animation manager 204A may determine or modify movement range of skeletal components based on an emotional value, such as increasing movement range of skeletal components and/or facial features based at least in part on emotional values associated with "happy" or "excited" and reducing movement range of skeletal components and/or facial features based at least in part on for emotional parameters associated with "sad" or "tired". In some embodiments, the emotion values may be applied to determine movement of skeletal components and/or facial features, such as a value of +2 (increase by 2 units or factor of movement), −3 (decrease by three units or factor of movement), 0 (no change, use default movement), etc.

The animation manager 204A may be designed to interact with one or more users and/or interact with the virtual environment presented by the VR/AR application. The animation manager 204A may generate animations that cause the avatar to interact with objects within a virtual environment, appear to interact with objects in the real world (e.g., look a person or object identified at a specific location in the real world via image capture from one or more cameras, etc.), or both. As an example, objects in the virtual environment may be processed by the recognition service 104D to create tags for the objects that describe the objects, such as including keywords, a name, and/or other information for respective objects. When a word in the text to be spoken by the avatar is associated with information in a tag, the animation manager 204A may evaluate the tagged object as a candidate for use in an animation sequence. For example, if the object is an orange, and the text includes the term "fruit", the animation manager 204A may generate an animation sequence to depict the avatar looking at the orange or pointing to the orange when saying the word "fruit" during playback of the audio data.

In some examples, the animation manager 204A may receive input signals that indicate objects and locations of the objects in the real world. For example, one or more cameras may capture images of a user interacting with a display that depicts the avatar, objects near the user, other people, and/or other objects. The recognition service 104D may be used to create tags for the objects and/or determine locations/coordinates that locate the objects/people relative to the display or other reference point. Microphone arrays may be used to locate users or a person speaking. The animation manager 204A may generate an animation sequence to depict the avatar looking at an object or person in the real world based on the input signals.

The speech input ingestion service 104B as illustrated in FIG. 2, is configured to analyze input text and/or other data to determine associations with objects, avatars, and/or other devices, as discussed above. As illustrated, the speech input ingestion service 104B includes a data store 202B and a speech input ingestion (SII) manager 204B.

As discussed briefly above, the speech input ingestion service 104B is configured to create metadata and/or SMD to indicate words associated with different objects, avatars, and/or real world objects (e.g., IoT devices). This metadata may be used to create animations. For example, when input text includes mention of an object, the object identifier may be associated with a word in the input text. This metadata may be used by the animation service to create an animated gesture toward the object or other animations that interact with the object and/or are associated with the object, such as by accessing or determining a location of the object in the virtual environment relative to the location of the avatar.

In some configurations, the SII manager 204B compares the tags associated with different objects (e.g., generated by the recognition service 104D) with the words in the input text to determine associations of the words with objects in a virtual environment. Similarly, tags of real world objects may be used by the speech input ingestion service 104B. The SII manager 204B may analyze the input text to determine if the input text includes speech by different avatars. When the input text does include words associated with speech of different avatars, the SII manager 204B may create metadata and/or otherwise create SMD to indicate words associated with an avatar, such as first words associated with a first avatar and second words associated with a second avatar.

The speech input ingestion service 104B may enable creation of more complex SMD and/or metadata, which may lead creation of animation that is more immersive and includes gestures and/or interactions involving objects in the virtual environment and/or dialog with multiple avatars. More details regarding the operation of the speech input ingestion service 104B are described below.

The virtual platform service 104C as illustrated in FIG. 2 is configured to assist a user in creating a virtual environment. As illustrated, the virtual platform service 104C includes a data store 204C and a virtual platform manager 204C.

As discussed briefly above, the virtual platform service 104C is utilized by the user 120 for creating a virtual environment. In some configurations, the user 120 provides client data utilized by the virtual platform service 104C to determine objects to include within the virtual environment. The client data can include many different types of data, such as an image taken from a camera, a graphical model such as a three-dimensional model of an object to place within the virtual environment, speech data indicating a name of an object, a category of an object, a type of an object, and the like. The client data can also include text data that indicates the one or more objects to include in the virtual environment.

The virtual platform manager 204C determines what services to utilize to obtain and/or ingest a provided model into the virtual environment. In some configurations, the virtual platform manager 204C determines whether the user 120 has provided a graphical model to be included within the virtual environment being created or whether the user has provided data indicating to search for a particular model or type of model. When the user 120 has provided a model, the virtual platform manager 204C utilizes the recognition service 104D to associate tags with the model. For instance, the recognition service 104D provides tags for the model that can indicate a category for the model, a name for the model, determines a size of the model, a color of the model, as well as other characteristics of the model. According to some configurations, the recognition service 104D provides "tagging" data to the search service 104G. The search service 104G stores this tagging information such that some service 104, application, or user can search for models within a virtual environment and/or within the service provider network 110 for inclusion within a virtual environment.

In other examples, when the client data 118 received is not a model, the virtual platform manager 204C utilizes the recognition service 104D to analyze and identify one or more objects within the graphics data. As discussed in more detail below, this identifying data received from the recognition service can be used by the virtual platform manager 204C when performing a search for models to include within the virtual environment.

The user 120 may also provide data that indicates that a search is to be performed to locate one or more objects to include within the virtual environment. For example, the user 120 may indicate (e.g. either through graphics data, speech data, text data, or the like) that the user would like to include a "table" within the virtual environment. This indication might be an image of the table, a name of a table, a type of table, or the like. To locate this table, the virtual platform manager 204C may generate one or more search terms and utilize a search service 104G to locate one or more objects to include within the virtual environment. The virtual platform service 104C can generate one or more search terms using the client data and/or service data received from the recognition service, the recommendation service, and/or some other service. For example, the virtual platform manager 204C can generate a search term for one or more of the tags provided by the recognition service 104D and/or generate one or more search terms based on speech data and/or other types of client data 118.

As briefly discussed above, the recommendation service 104H can generate and provide recommendations for one or more graphical models that may be included within the virtual environment. In some configurations, the recommendation service 104H communicates with one or more of the virtual platform service 104C, the recognition service 104D, the search service 104G, and/or one of the other available services 104, or some other application or component. The recommendation service 104H may utilize data that provides an indication of preferences of the user 120 that is interacting with the virtual environment and/or who is developing a VR/AR application. For instance, the data can indicate: acquisition of one or more products by the user 120 from a service associated with the service provider network 110; browsing history of the user, search history of the user, user supplied preferences, and the like. In some configurations, the one or more graphical models that are selected for recommendation by the recommendation service 104H might be based at least, in part, on previous purchases made by the user with an online service. For instance, when the user requests a "lamp" for inclusion within a virtual environment, the recommendation service 104C may receive the tag "lamp" from the virtual platform service 104C, the recognition service 104D, and/or the search service 104G and determine lamp recommendations based on the purchase/viewing history of the user 120. In other examples, the recommendation service 104H may also utilize one or more rules (discussed in more detail below) in determining the recommendations. For instance, a rule used in creating a virtual environment may indicate that the model to include is a specific color, a certain size, and the like.

In some examples, the recommendation service 104H may select a top number of graphical models for recommendation (e.g., 2, 5 or 10). For example, if there are one hundred models that are determined to be candidates for recommendation, the recommendation service 104H may determine the models that are ranked the highest according to specified parameters (e.g., cost, style) associated with the user.

According to some configurations, the virtual platform manager 204C causes a display of at least a portion of the identified models to be displayed within the user interface 130 on display 106. In some configurations, the display is a three-dimensional display. According to some examples, the virtual platform service 104C can position the object(s) according to one or more rule sets and/or other data indicating a positioning of the objects. For example, the data store 202C may include rules data 302I that provides rules for placing objects within environments. As is discussed in more detail below, the rules data can include information on how objects are to be placed within the virtual environment (e.g., disability requirements, building code requirements, and the like).

In some examples, the virtual platform manager 204C can adjust one or more characteristics of one or more of the objects to ingest into the virtual environment. For example, a size and/or scale of a graphical model can be adjusted to fit the sizing requirements of the virtual environment. In some configurations, the client can specify the location of the object within the virtual environment. In other configurations, the virtual platform service 104C can determine a location of the object within the virtual environment. For example, the user 120 or some other authorized user could specify that a layout of an office is to follow an accessibility ruleset as well as a company ruleset. More details with regard to the operation of the virtual platform service 104C and the virtual platform manager 204C are provided below.

The contextual service 104J as illustrated in FIG. 2, as well as the other services discussed above with regard to FIG. 1 may include one or more application servers, Web servers, data storage systems, network appliances, dedicated hardware devices, and/or other server computers or computing devices for providing the functionality of the different services. In these examples, the computing device 102 can include minimal hardware for connection to a network-based computing platform via a network (not shown). The computing device 102 may communicate via the network to access various services or computing resources described herein. For example, the computing device 102 can access the contextual service 104J, and the other services 104. More details regarding the operation of the contextual service 104, and the animation manager 204A, the disambiguation manager 205B, and virtual platform manager 204C are provided below.

All or a portion of the applications 110 may utilize a service API 112, such as a contextual service API 112, to interact with the contextual service 104J. As discussed above, the applications 114 might be any instructions or data that provide one or more functions. The applications 114 may be configured to call one or more methods exposed by the contextual service API 112 to access the contextual service 104J via a network to take advantage of one or more of the features provided by the contextual service 104. For example, the contextual service API 112 may be used by one or more of the applications 110 and/or one of the services 104 to register to receive notifications, and possibly be activated, in response to a current context. For example, the animation manager 204A can register to receive notifications of when a context associated with user 120 changes. In another example, an application 110 can register to receive notifications of when a context associated with the user 102 changes. The contextual service API 112 might also be used to send data to another application 110, request data relating to a current context, and the like.

As illustrated, the contextual service 104 manages one or more sessions during which a computing device, such as the computing device 102, interacts with the contextual service 104J. The contextual service 104J may support connections to any number of computing devices 102 so that a plurality of users utilizing the various computing devices 102 can share data with the contextual service 104J, as well as one or more of the other services 104, and possibly with one another. As such, the illustrated example is merely illustrative, and should not be construed as being limiting in any way.

In the current example illustrated in FIG. 2, the contextual service 104J identifies services 104 that are relevant to a current context of a user (e.g., the user 120) and provides service data 118 to the services identifies to be relevant to the context. As such, the relevant services 104 to a current context of the user may be utilized by a VR/AR application 110.

In order to determine a current context for a user, the client manager 114 might utilize one or more of the sensors 122 of the computing device 102. The sensors 122 might be configured to determine at least a portion of the client data 118. For examples, the sensors 122 might determine location data, movement data (e.g., speed or acceleration data), weather data, biometric data, time data, lighting data, facial recognition data, graphical data associated with the user 120, graphical data associated with the virtual environment presented to the user 120, and the like. Some of the client data 118 that is associated with a current context of the user 120 might be determined from the current activity performed within the VR/AR application 110. For example, a current activity might relate to a user performing a search, a user moving within the virtual environment, a user accessing a website, and the like. In some examples, the client manager 124 aggregates the various data relating to the current context and sends the client data 118 to the contextual service 104J and/or other services 104.

The contextual service 104J uses the received client data 118 to identify one or more services 104 that are relevant to the current context. As briefly discussed above, a service 104 may be determined to be relevant for a particular context based, at least in part, on whether the service 104 registered with the contextual service 104J to be activated in response to a current context indicated by the client data 118. For example, the contextual service 104J may determine that the services 104A, 104B, 104D and 104G are relevant to the context specified by the client data 118. In this example, the services 104A, 104B, 104D and 104G may be identified in response to a user searching for a particular environment within the environment presented by the VR/AR application. In some examples, the client manager 114 is configured to monitor the context of the user and to provide the client data 118 associated with the context to the contextual service 104J.

Figure 3:
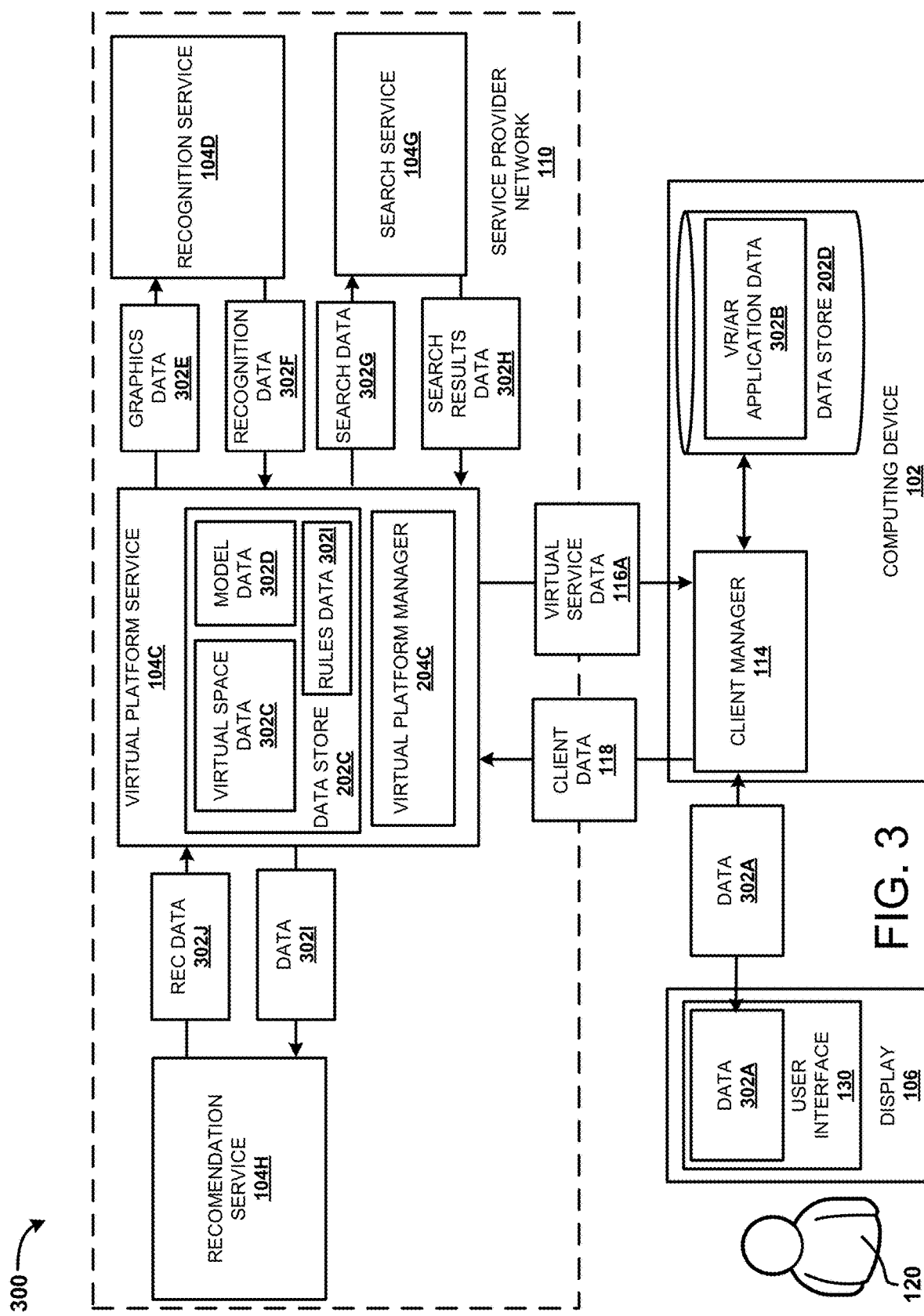
FIG. 3 is a system diagram that illustrates using a virtual platform service for creating a virtual environment for a VR/AR application.

FIG. 3 is a system diagram 300 that illustrates using the virtual platform service 104C for creating a virtual environment for a VR/AR application. System diagram 300 includes the virtual platform service 104C in communication with the recognition service 104D, the search service 104G, the recommendation service 104H, and one or more other services. The virtual platform service 104C may include the virtual platform manager 204C, and the data store 202C.

As discussed briefly above, the virtual platform service 104C is utilized by the user 120 for creating a virtual environment. In some configurations, the user 120 provides client data 118 that is used by the virtual platform service 104C to determine objects to include within the virtual environment. The client data 118 can include many different types of data. For example, the client data 118 can include graphics data such as an image taken from a camera, a graphical model such as a three-dimensional model of an object to place within the virtual environment, speech data indicating a name of an object, a category of an object, a type of an object, and the like. The client data 118 can also include text data that indicates the one or more objects to include in the virtual environment. The client data 118 can be obtained from one or more sensors 122 of the computing device 192, the data store 202D (e.g., a portion of the VR/AR application data 302B), and the like.

After receiving the client data 118, the virtual platform manager 204C determines what services to utilize to obtain and/or ingest a provided model into the virtual environment. In some configurations, the virtual platform manager 204C determines whether the user 120 has provided a graphical model to be included within the virtual environment. For example, the user 120 may upload a graphical model to include within the virtual environment. When the user 120 has provided a model, the virtual platform manager 204C may provide graphics data 302E to the recognition service 104D.

As discussed above, the recognition service 104D associates tags with the model. For instance, the recognition service 104D provides a category for the model, a name for the model, determines a size of the model, a color of the model, as well as other characteristics of the model. Each of these tags can be utilized by other services 104, such as the search service 104G, for locating objects for inclusion within a virtual environment and/or for inclusion within a virtual environment. The recognition service 104D provides the recognition data 302F to the virtual platform manager 204C. The virtual platform manager 204C can then store the model specified by the user 120 along with the tags generated by the recognition service 104D. The virtual platform manager 204C may then include this model in the virtual environment and store the virtual environment as virtual space data 302C within the data store 202C.

In examples, when the client data 118 received is not a model but is graphical data, the virtual platform manager 204C may provide the graphics data 302E to the recognition service 104D. As discussed above, the recognition service 104D analyzes the graphics data 302E to detect and identify one or more objects within the graphics data 302E. As discussed in more detail below, this identifying data received from the recognition service can be used by the virtual platform manager 204C when performing a search for models to include within the virtual environment.

The client data 118 may also provide an indication that a search is to be performed to locate one or more objects to include within the virtual environment. For example, the client data 118 may indicate (e.g. either through graphics data, speech data, text data, or the like) that the user 120 would like to include a "table" within the virtual environment. This indication might be an image of the table, a name of a table, a type of table, or the like. To locate this table, the virtual platform manager 204C may generate one or more search terms and utilize the search service 104G to locate one or more objects to include within the virtual environment. The virtual platform service 104C can generate one or more search terms using the client data 118 and/or the recognition data 302F received from the recognition service 104D. For example, the virtual platform manager 204C can generate a search term for one or more of the tags provided by the recognition service 104D and/or generate one or more search terms based on speech data and/or other types of client data 118.

The virtual platform manager 204C provides the search terms via search data 302G to the search service 104G. The search service 104G uses the search terms in the search data 302G to locate one or more graphical models to include within the virtual environment. In response, the search service provides search results data 302A to the virtual platform service 104C indicating the results of the search.

In some examples, the virtual platform manager 204C interacts with the recommendation service 104H to assist in determining the graphical models to include and/or recommend to include within the virtual environment. According to some configurations, the recommendation service 104H may utilize data 302I to generate recommendations for one or more graphical models for the user 120. The data 302I may indicate an identity of the user 120 such that the recommendation service 104H can access the purchase/preference data associated with the user 120. As discussed above, the recommendation service 104H can generate the recommendations for the user 120 based on previous acquisitions of the user 120 from a service associated with the service provider network 110, browsing history of the user, search history of the user, user supplied preferences, and the like. For instance, when the user 120 requests a "table" for inclusion within a virtual environment, the recommendation service 104C may identify tables that the user 120 has either purchased and/or viewed previously. In other examples, the recommendation service 104H may also utilize one or more rules included within the rules data 320 in determining the recommendations. According to some configurations, the virtual platform manager 204C causes a display of at least a portion of the identified models to be displayed within the user interface 130 on display 106. In some configurations, the display is a three-dimensional display. According to some examples, the virtual platform service 104C can position the object(s) according to one or more rule sets and/or other data indicating a positioning of the objects. For example, the data store 202C may include rules data 302I that provides rules for placing objects within environments. In other examples, the objects identified can be positioned based at least in part on a recommendation service 104H, preferences of the user, and the like. For instance, the objects returned by the search service 104G can be ordered based on previous actions of the user (e.g., purchases, uses, . . . ), preferences of the user, and/or preferences and/or rules of some other service 104 and/or authorized user.

In some examples, the virtual platform manager 204C can adjust one or more characteristics of one or more of the objects to ingest into the virtual environment. As discussed above, the virtual platform service 104C can determine to change one or more characteristics of a graphical model, or some other object, to be ingested into the virtual environment. For example, a size and/or scale of a graphical model can be adjusted to fit the sizing requirements of the virtual environment. In some examples, the characteristics can be adjusted to match other models included within the virtual environment. In some configurations, tags associated with the model can be accessed within model data 302D to determine a current size of the model. Similarly, an object color could be changed to match a color palette associated with the virtual environment.

The virtual platform manager 204C then ingests the object(s) into the virtual environment. In some configurations, the client can specify the location of the object within the virtual environment. In other configurations, the virtual platform service 104C can determine a location of the object within the virtual environment. For instance, the virtual platform service 104C can determine a location of a desk within an office based on one or more rulesets (e.g., stored within rules data 302I) associated with configuring an office. For example, the client or some other authorized user could specify that a layout of an office is to follow an accessibility ruleset as well as a company ruleset. A ruleset can include any rules that are associated with an environment. For example, a ruleset can specify city code requirements for layout of a space, required objects to be placed into a space, and the like. In some cases, the rulesets can be obtained from different sources, such as but not limited to government regulations, building regulations, architecture guidelines, color compatibility, and the like. For instance, the virtual platform service 104C can utilize other rulesets such as a ruleset associated with Feng shui, and the like. As another example, when some other object is to be associated with the virtual environment (e.g., a light switch, a light, etc.) rules data can be accessed to assist in determining where to locate the object. In yet other configurations, the virtual platform service an access historical data that is associated with the user creating the virtual environment. For instance, the historical data can provide an indication of what type of model to place within the virtual environment, as well as where to place the model. The virtual platform manager 204C may then store the virtual environment as virtual space data 302C within the data store 202C.

Figure 4:
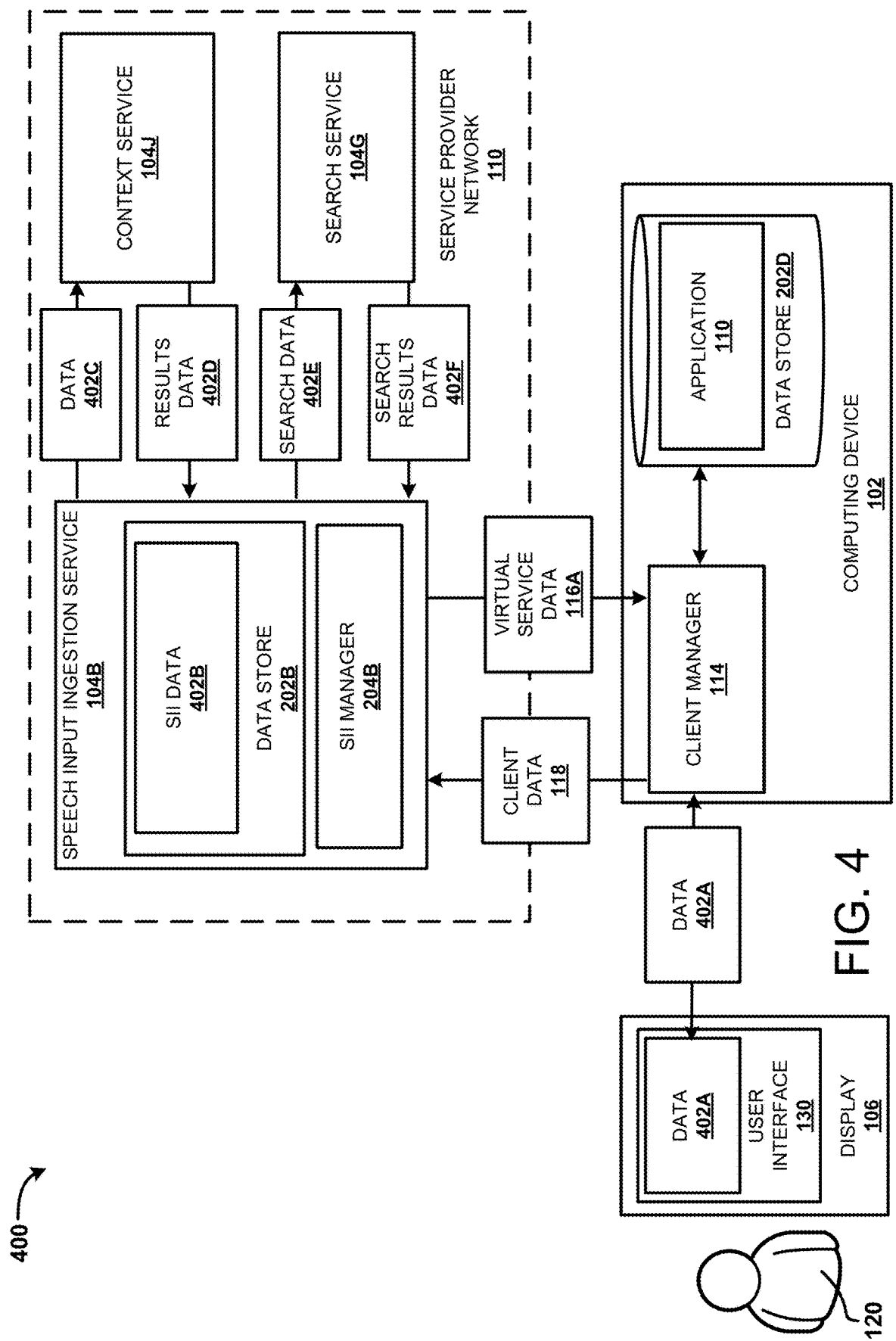
FIG. 4 is a system diagram that illustrates using the speech input ingestion service to process inputs associated with a VR/AR application.

FIG. 4 is a system diagram 400 that illustrates using the speech input ingestion service to process inputs associated with a VR/AR application. System diagram 400 includes the speech input ingestion service 104B in communication with the search service 104J and the context service 104J, and one or more other services. The speech input ingestion service 104B may include the SII manager 204B, and the data store 202B.

As discussed above, different types of client data is received by the speech input ingestion service 104B. The different types of client data can include input text data as at least part of the data 402A. The SII manager 204B identifies the services to be utilized based on the data 402A received. For example, some data 402C may be provided to the context service 104J, which may return results data 402D, while search data 402E may be provided to the search service 104G, which may return search results data 402E. Instead of having to include the functionality of the different services 104, the speech input ingestion service 104B can utilize functionality provided by existing services within the service provider network 110.

The SII manager 204B may determine object tags associated with words in the input text of the data 402A. In some embodiments, the SII manager 204B may send some words to the context service 104J and/or the search service 104G for additional processing. For example, the context service 104J may generate additional associations of words and objects in the virtual environment. The search service 104G may provide information about a graphical interface, which may enable discover of additional tags that are relevant to words in the input text of the data 402A.

As discussed above, the SII manager 204B may analyze the input text of the data 402A to determine speakers associated with words in the input text. The SII manager 204B may create metadata, modify the SMD, and/or parse the words into separate streams for processing by the text-to-speech service, for example. In some embodiments, the metadata may associate a first avatar with first words of the input text and associate a second avatar with second words of the input text. The words may then be used by other services described herein to create first and second audio data and first and second animations for the respective first and second avatars (and possibly other avatars). Thus, the SII manager 204B may organize input data to enable creation of audio data and animation of multiple avatars.

The SII manager 204B may analyze the text to determine object that may be animated or otherwise effected based on the input text. For example, a virtual object may be referenced explicitly or implicitly in the input text, and may be animated or otherwise caused to undergo some visual or audible effect (e.g., turn a light on, emit a sound, etc.). The SII manager 204B may analyze the text to determine words associated with activation of real world objects, such as IoT devices. These words may be associated with activation of the real world object (e.g., turning on a real light, causing a microphone to emit sound, causing a haptic device to turn on/off, etc.). The SII manager 204B may create metadata, create and/or modify SMD, and/or provide signals to cause these animations and/or effects discussed above.

Figure 5:
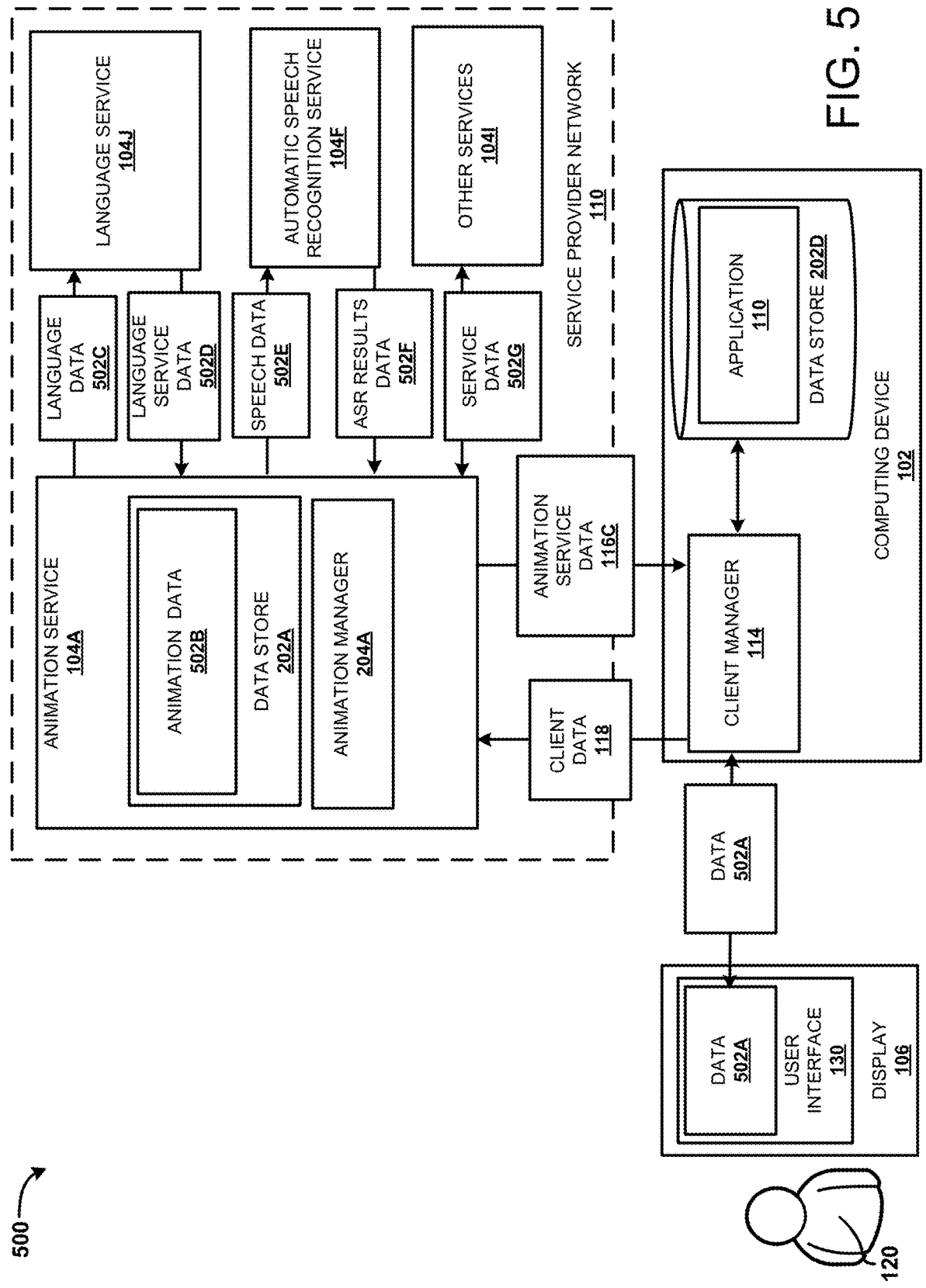
FIG. 5 is a system diagram that illustrates using the animation service for providing animations of one or more avatars for a VR/AR application.

FIG. 5 is a system diagram 500 that illustrates using the animation service 104a for providing animations of one or more avatars for a VR/AR application. System diagram 500 includes the animation service 104A in communication with the language service 104J, the ASR service 104F, and one or more other services 104I. The animation service 104A may include the animation manager 204A, and the data store 202A.

As discussed above, the animation service 104A can be configured to provide animation of one or more avatars. The animation manager 204A can communicate with different services 104 to receive input text to be spoken by an avatar. For example, the animation manager 204 may utilize the language service 104J to translate text into a language specified by the user 120, or some other authorized user. The input text may be stored in the data store 202A. The text may be processed using the text-to-speech service 104E and/or the ASR service 104F. The audio data may be configured for playback to create sounds of a person speaking the text. In various examples, different speaker attributes may be selected or employed to create different sound effects, such as a female voice, a male voice, a deep voice, a high pitched voice, and so forth. In addition to the audio data, speech markup data (SMD) may be created from the text by the text-to-speech service 104E and/or the ASR service 104F and stored in the data store 202A. The SMD may include the sentences of the text, words of the text and/or phonic symbols of the text, which may each include time codes that indicate a time of playback of a respective element of the audio data (e.g., playback of a particular sound at a certain time, etc.). In some examples, the text may be translated from a first language to a second language prior to or after processing by the text-to-speech processor.

The animation manager 204A may receive the SMD, possibly with metadata from the speech input ingestion service 104B, which may be processed to create animations for an avatar. For example, the animation manager 204A may generate first animation sequences of facial features, such as a mouth, of the avatar based at least in part on the phonic symbols and the different time codes associated with each phonic symbol. The animation manager 204A may generate second animation sequences of skeletal components of the avatar based at least in part on the words and the different time codes associated with each word or combinations of words. The skeletal components may include a torso, neck, head, legs, arms, hands, fingers, and/or other body parts that may move to perform gestures and/or animations.

The animation manager 204A may determine animations based on selected words, which may be associated with animation sequences or gestures. For example, the word "big" may be associated with an animation sequence that acts out extending arms from side to side in a gesture of "big" whereas the word "small" may be associated with an animation sequence that acts out extending, in front of the avatar's head, an index finger and thumb slightly apart to form a small gap in a gesture of "small". Many different words may be associated with different animation sequences or gestures. The animation manager 204A may process an occurrence of the word in the text that includes an animation sequence as a candidate for performance of the animation sequence. However, the performance may be based on implementation of rules, which may be used to select which words are selected for animation sequences and which words do not initiate special animation sequences.

As an example, the animation manager 204A may receive metadata and/or SMD directly or indirectly from the SII service 104B. The animation manager 204A may identify and process information that identifies object identifiers or locations associated with words, which may be used to create gestures toward locations in the virtual environment associated with the object identifiers and/or locations. For example, a word in the input text (and in the SMD) may the word "apple", which is associated with an object identifier "object_apple". In the virtual environment, the "object_apple" has one or more tags and a known location based on placement by the virtual platform service 104C. When the animation manager 204A process the SMD and access a reference (via metadata, the SMD, or another source), the animation manager may create or select an animation to gesture or otherwise interact with the object at the known location of the object. As an example, the input text may include "this is an apple". In a first virtual environment may include an apple located to the left of the avatar while a second virtual environment may include an apple located to the right of the avatar. The SII service may create metadata such as: "this is an apple"<object_apple, point>. When processing this in the first virtual environment, the animation manager 204A may generate or select animations for the avatar to point to the left toward the apple. When processing this in the second virtual environment, the animation manager 204A may generate or select animations for the avatar to point to the right toward the apple, even though the command is the same. To accomplish this, the animation manager 204A may associate the location of the avatar with the location of the "object_apple" in the virtual environment. Thus, the metadata may enable relational positioning of objects relative to the avatar. Absolute positions may also be created by the SII service 104B, and used accordingly, such as by inserting an {X, Y, Z} coordinate or other type of coordinate. In some embodiments, the object may be another avatar.

As another example, the animation manager 204A may receive SML for different avatars (as created by the SII service 104B) and process the SMD for each character to create respective animations. The animation manager 204A may then stitch the animations together to create animated interaction between avatars.

In some instances, the animation manager 204A may receive metadata from the SII service 104B, which indicates effect or animations of object in the virtual world, and/or signals to be transmitted to real world objects, such as IoT devices. The metadata, of course, may create a temporal relationship with the effect and/or animation, such that the animation or effect is coordinate with output of the animation and/or output the audio data created from the input text included in the SMD or associated with the SMD.

The animations sequences may be stored in the data store 202A and may be associated with words, phonic symbols, idioms, and/or other data. The animation manager 204A may access select animation sequences based on the text and the SMD to be processed. In some examples, similar words may be associated with a same animation sequence or similar variations thereof. Thus, words may be grouped into different categories, which may be associated with similar or same animation sequences. For example, the words "big", "huge", "enormous" and "giant" may all be grouped into a same category and may all be associated with a same animation sequence or a similar animation sequence, possibly only varying in a movement range of the animated sequence.

The animation manager 204A may generate combined animation sequences of the avatar that include the first animation sequences and the second animation sequences, which may be stored in the data store 202A, possibly as a file. In some examples, some animation sequences may be blended with other sequences to create and depict natural looking movement of the avatar. For example, when animation sequences conflict in a time period (such as the words "big" and "small" are used within a short period of time (a few seconds), then both example animation sequences discussed above may not be selected since they conflict and would not depict a natural looking animation. In such an instance, the animation manager 204A may select one of the words for use to generate (or select) an animation sequence or may not select either words to generate or select an animation sequence(s). Blending may enable transition between a first animation sequence and a subsequent animator sequence. In some examples, blending may be performed by having the avatar return to a standard pose before performing the subsequence animation sequence. The standard pose may vary based on a context. For example, if the animation of the avatar depicts the avatar in a seated position, the standard pose for that avatar may be different than a standard pose for an avatar depicted as standing.

In some configurations, the animation manager 204A may receive or determine an emotion value associated with the text, and may use the emotion value (e.g., an parameter, weight, or other designator) to influence the animation sequence, the standard pose, and/or other attributes of the animation. The emotion value may be received from the ASR service 104F, for example, and/or be generated or provided as discussed above. The animation manager 204A may determine or modify movement range of skeletal components and/or facial features based on an emotional value, such as increasing movement range for emotional values associated with "happy" or "excited" and reducing movement range for emotional values associated with "sad" or "tired".

The animation manager 204A may be designed to interact with one or more users and/or interact with the virtual environment presented by the VR/AR application. The animation manager 204A may generate animations that cause the avatar to interact with objects within a virtual environment, appear to interact with objects in the real world (e.g., look a person or object identified at a specific location in the real world via image capture from one or more cameras, etc.), or both. As an example, objects in the virtual environment may be processed by the recognition service 104D to create tags for the objects that describe the objects, such as including keywords, a name, and/or other information for respective objects. When a word in the text to be spoken by the avatar is associated with information in a tag, the animation manager 204A may evaluate the tagged object as a candidate for use in an animation sequence. For example, if the object is an orange, and the text includes the term "fruit", the animation manager 204A may generate an animation sequence to depict the avatar looking at the orange or pointing to the orange when saying the word "fruit" during playback of the audio data.

In some examples, the animation manager 204A may receive input signals that indicate objects and locations of the objects in the real world. For example, one or more cameras may capture images of a user interacting with a display that depicts the avatar, objects near the user, other people, and/or other objects. The recognition service 104D may be used to create tags for the objects and/or determine locations/coordinates that locate the objects/people relative to the display or other reference point. Microphone arrays may be used to locate users or a person speaking. The animation manager 204A may generate an animation sequence to depict the avatar looking at an object or person in the real world based on the input signals.

Figure 6A:
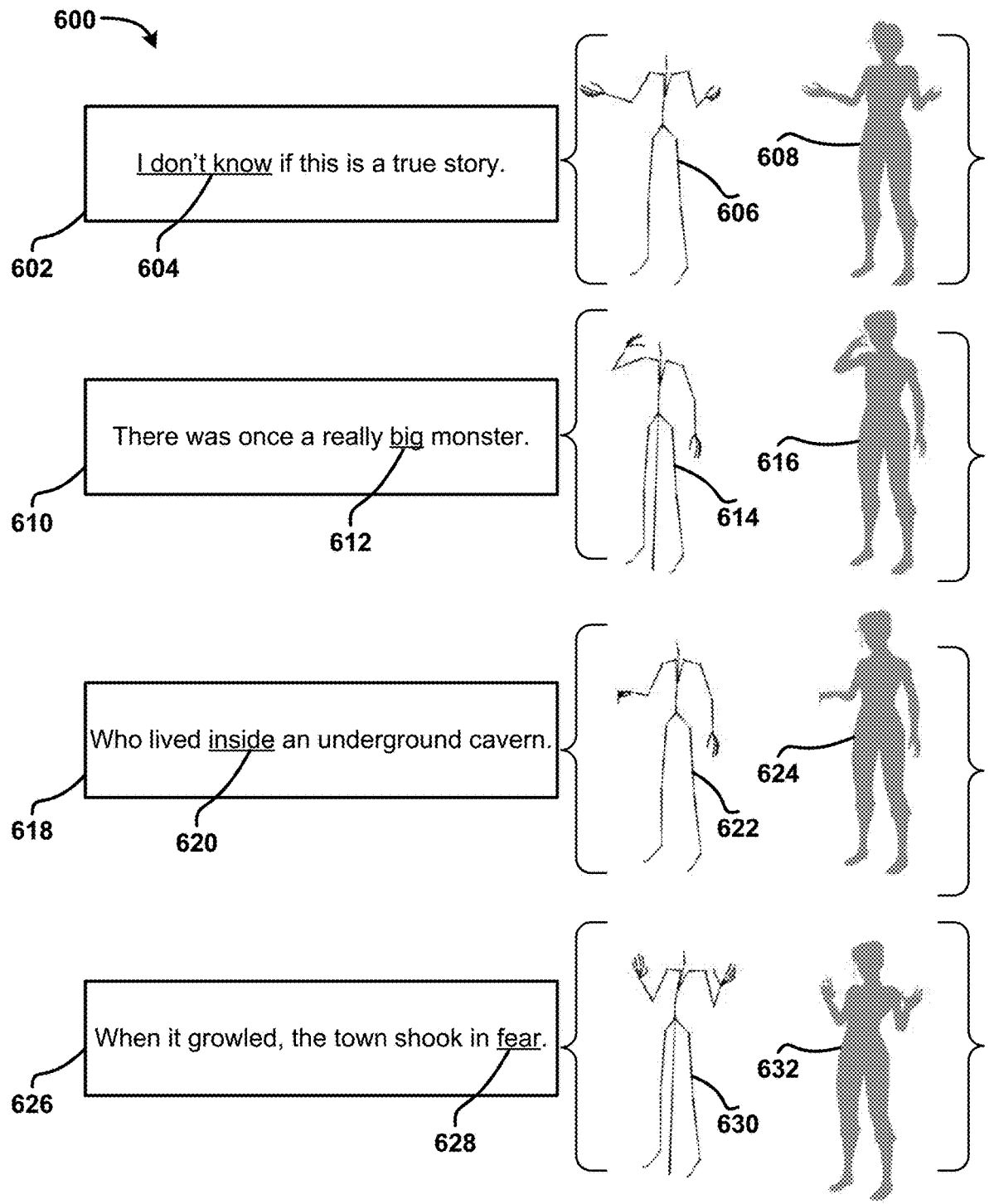
FIG. 6A is a schematic diagram of different illustrative animation body sequences based on input words spoken by an avatar.

FIG. 6A is a schematic diagram 600 of different illustrative animation body sequences for an avatar based on different input words spoken by the avatar. In some examples, a collection of animation sequences may be associated with different words, combination of words, phonic symbols, and/or other parts of speech, which may be included in the speech markup data (SMD) that is derived from the text.

As shown in FIG. 6A, a first input of text 602 may be received and processed to identify keywords associated with animation sequences. For example, the text "I don't know if this is a true story" may be processed by the animation manager 204A to determine that one or more of the words "I don't know" include a first keyword(s) 604 that is associated with a first skeletal animation sequence 606. The first skeletal animation sequence 606 may cause animation of skeletal components of the avatar to extend arms with palms of hands facing upwards to create a gesture associated with "I don't know". The animation manager 204A may cause rendering of texture mappings (e.g., clothing, skin, etc. on avatars) to depict a first avatar animation sequence 608. The animation may be triggered to start performance upon playback of the audio data at a certain word (e.g., the first keyword 604, etc.) or at a time code associated with the word or words that trigger the animation sequence. The first skeletal animation sequence 606 may last only part of the time that the animation manager 204A processes animations for facial features (e.g., mouth movements, etc.), which animate speaking of the text as discussed below in FIG. 6B. The animations may synchronized with playback of the audio data. After completion of the first avatar animation sequence associated with "I don't know", the animation manager 204A may animate the avatar to a standard pose, such as to render the avatar in a standing position with hands in a relaxed and downward position near the avatar's waist, for example. The standard pose may include some animated movements that do not depict or convey any recognizable gestures, and may be performed during replay of at least some of the words "if this is a true story".

In some examples, one or more words of the phrase "if this is a true story" may include other keywords associated with another animation sequences. Those additional animation sequences may or may not be selected for use by the animation manager 204A, such as based on application of rules. The rules may establish an amount of time (e.g., a falloff time) between animation sequences, which animations can precede or follow other animation sequences, and amounts of buffer time between (for execution of the standard pose), and so forth. For example, the rules may limit use of only one animation sequence every N amount of seconds or milliseconds (e.g., where N may be 3 seconds or 3000 milliseconds, or any other predetermined amount of time). Thus, if playback of a portion of the audio data takes 10 seconds and the limit for each sequence is 3 seconds (N=3 seconds), then the playback could only have up to three different animation sequences that include gestures based on keywords, but would likely have fewer animation sequences since not all words in the audio data will include an association with animation sequences. The rules may be stored in the data store 202A. The following provides additional examples of text and animation sequences to further illustrate the concepts discussed herein.

A second input of text 610, "There once was a really big monster", may be received and processed to identify keywords associated with animation sequences. For example, the text "big" may be processed by the animation manager 204A and determined as a second keyword(s) 612 that is associated with a second skeletal animation sequence 614. The second skeletal animation sequence 614 may cause animation of skeletal components of the avatar to move an arm near a head of the avatar and extend an index finger from a thumb to create a gesture associated with "big". The animation manager 204A may cause rendering of texture mappings (e.g., clothing, skin, etc. on avatars) to depict a second avatar animation sequence 616. The animation may be triggered to start performance upon playback of the audio data at a certain word (e.g., the second keyword 612, etc.) or at a time code associated with the word or words that trigger the animation sequence. The second skeletal animation sequence 614 may last only part of the time that the animation manager 204A processes animations for facial features (e.g., mouth movements, etc.). The second skeletal animation sequence 614 may be preceded by the avatar being in the standard pose while the words "there was once a really" are played back.

A third input of text 618, "Who lived inside an underground cavern", may be received and processed to identify keywords associated with animation sequences. For example, the text "inside" may be processed by the animation manager 204A and determined as a third keyword(s) 620 that is associated with a third skeletal animation sequence 622. The third skeletal animation sequence 622 may cause animation of skeletal components of the avatar to extend an arm outward from a torso and point a finger downwards toward the ground to create a gesture associated with "inside". The animation manager 204A may cause rendering of texture mappings (e.g., clothing, skin, etc. on avatars) to depict a third avatar animation sequence 624. The animation may be triggered to start performance upon playback of the audio data at a certain word (e.g., the third keyword 620, etc.) or at a time code associated with the word or words that trigger the animation sequence. The third skeletal animation sequence 622 may last only part of the time that the animation manager 204A processes animations for facial features (e.g., mouth movements, etc.). The third skeletal animation sequence 622 may be preceded by the avatar being in the standard pose while the words "who lived" are played back, and may return to the standard pose for at least playback of some of the words "an underground cavern".

A fourth input of text 626, "When it growled, the town shook in fear", may be received and processed to identify keywords associated with animation sequences. For example, the text "fear" may be processed by the animation manager 204A and determined as a fourth keyword(s) 628 that is associated with a fourth skeletal animation sequence 630. The fourth skeletal animation sequence 630 may cause animation of skeletal components of the avatar to extend arms upwards and shake hands back and forth quickly to create a gesture associated with "fear". The animation manager 204A may cause rendering of texture mappings (e.g., clothing, skin, etc. on avatars) to depict a fourth avatar animation sequence 632. The animation may be triggered to start performance upon playback of the audio data at a certain word (e.g., the fourth keyword 628, etc.) or at a time code associated with the word or words that trigger the animation sequence. The fourth skeletal animation sequence 630 may last only part of the time that the animation manager 204A processes animations for facial features (e.g., mouth movements, etc.). The fourth skeletal animation sequence 630 may be preceded by the avatar being in the standard pose while the words "who lived" are played back, and may return to the standard pose for at least playback of some of the words "an underground cavern".

Figure 6B:
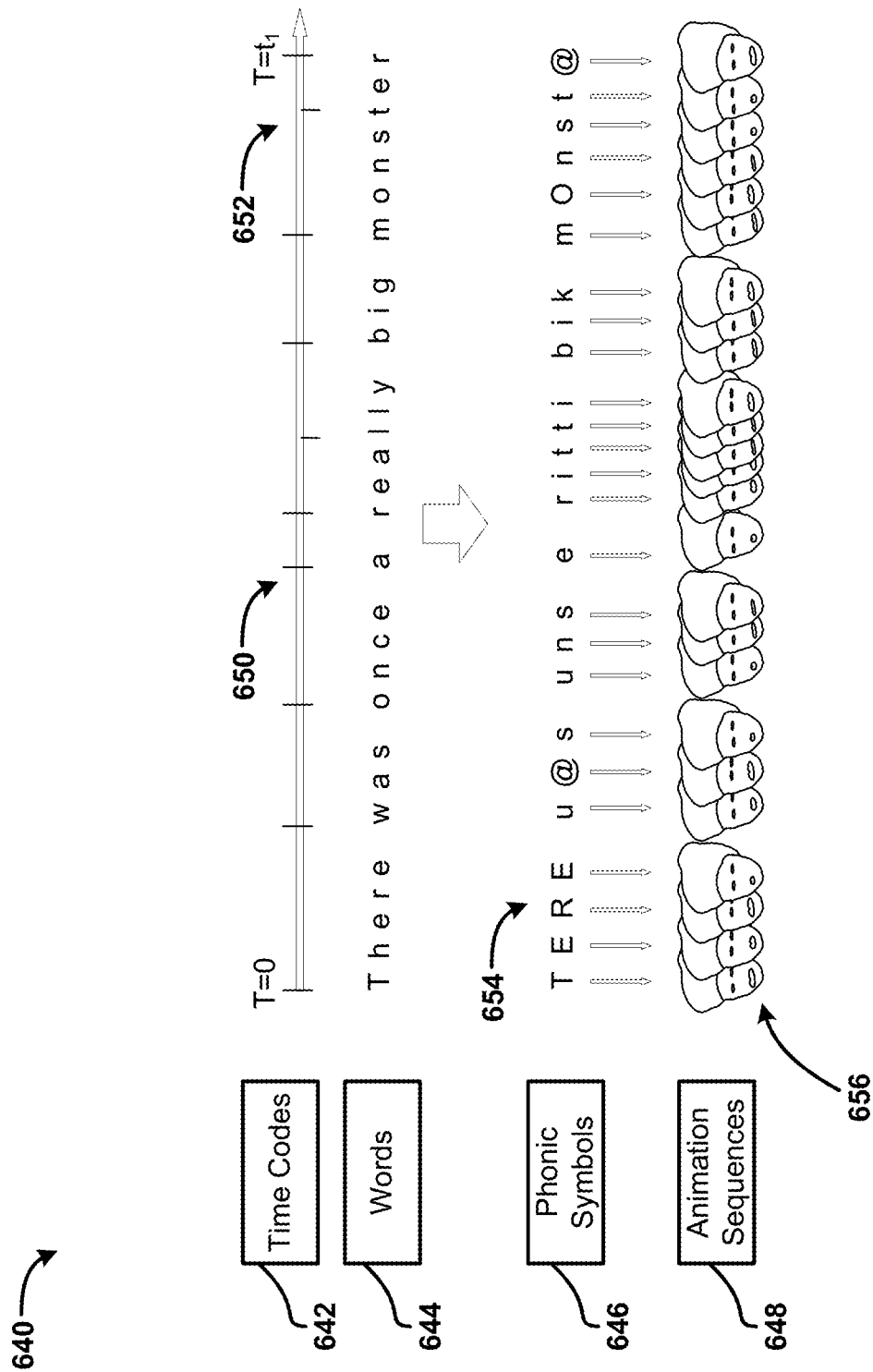
FIG. 6B is a schematic diagram of different illustrative animation facial sequences based on input phonics spoken by an avatar.

FIG. 6B is a schematic diagram 640 of different illustrative animation facial sequences based on input phonics spoken by an avatar. The diagram 640 includes time codes 642, words 644, phonic symbols 646, and animation sequences 648 based on at least the phonic symbols 646.

The time codes 642 may span an amount of time (e.g., $t_1$) used to playback the audio of the text or portion of the text. In the example provided in FIG. 6B, the text reads "There was once a really big monster." The time codes 642 may include first time codes 650 that indicate a time of occurrence of each word in the text. The time codes 642 may include second time codes 652 that indicate a time of occurrence of each phonic symbol in the text. The combined time codes may represent third time codes, which may be used to cue the different animation sequences 648, such as skeletal animations and facial animations.

The words may be analyzed by the ASR service 104F to create the speech markup data that includes the phonic symbols 646. The specific phonic symbols 654 may be associated with animation sequences of facial features and/or mouth movements 656. The phonic symbols 654 may be unique sounds, sounds associated with particular mouth or facial movements, or other subdivisions of words or sentences used to create or select animation sequences. Different levels of granularity may be used to describe the words other than the phonic symbols shown in FIG. 6B. For example the text may include more phonic symbols than the nine phonic symbols shown in FIG. 6B. The animation sequences 648 and corresponding phonic symbols 646 may be stored in the data store 202A. The animation sequences 648 may be associated with the third time codes and may be played back at occurrence of the third time code to synchronize movement of facial features and/or mouth movements with playback of the audio data to animate speaking by the avatar.

The animation sequences 648 may be applied, during animation, to a face of the avatar while the avatar performs animations of the skeletal components, as shown and described above with reference to FIG. 6A. Thus, the animations may cause the mouth movements via the animation sequences 648, and may perform the second skeletal animation sequence 614 at or near replay of the word "big" during playback of the audio data to create combined animation sequences.

FIGS. 7A, 7B, 8A, 9A, 11A, and 11B are flow diagrams showing routines that illustrate aspects of using a framework that provides VR applications and/or AR applications the ability to access to different services. It should be appreciated that the logical operations described herein with respect to FIGS. 7-11E, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic and any combination thereof. It should also be appreciated that more or fewer operations may be performed than shown in the FIGS. and described herein. These operations may also be performed in parallel, or in a different order than those described herein.

Figure 7A:
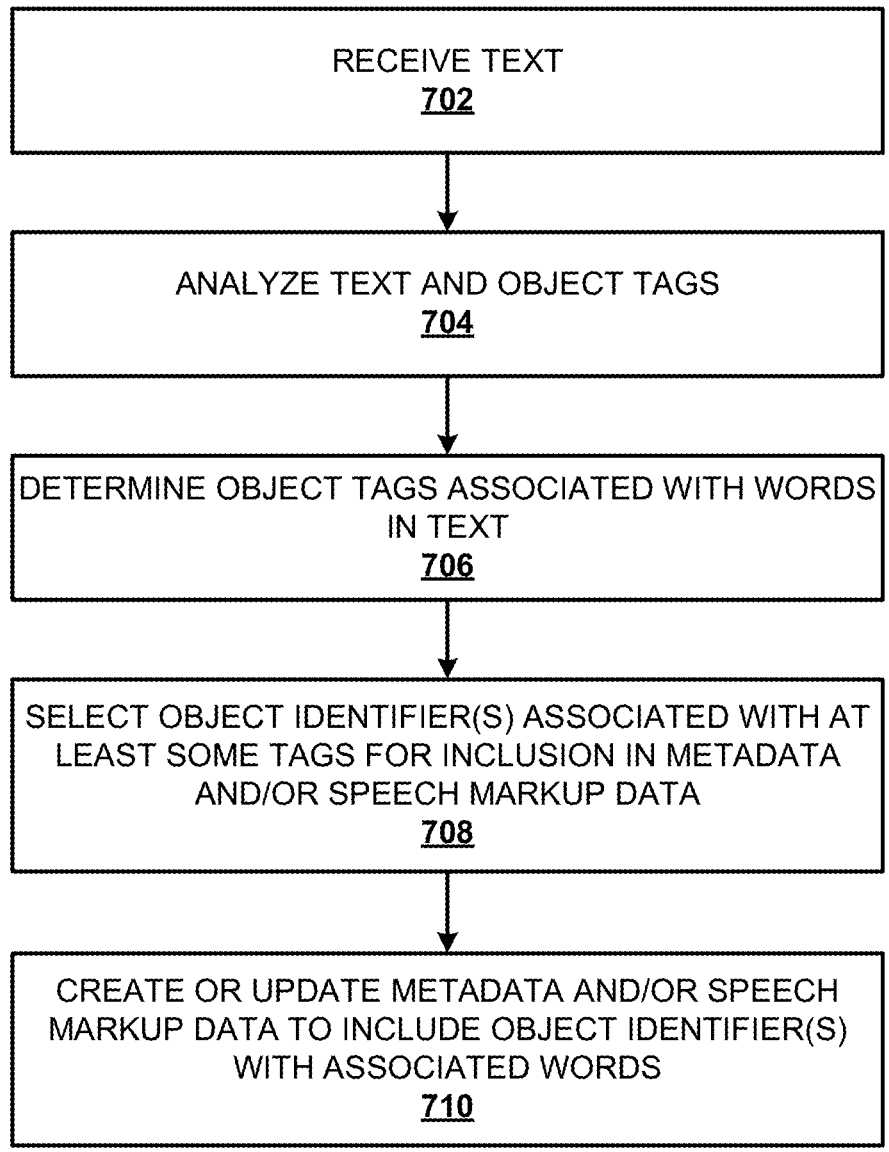
FIG. 7A is a flow diagram showing a routine illustrating aspects of a mechanism disclosed herein for input by the speech input ingestion to identify objects and/or locations in a virtual environment.

FIG. 7A is a flow diagram showing a process 700 including a routine illustrating aspects of a mechanism disclosed herein for input by the speech input ingestion to identify objects and/or locations in a virtual environment.

At 702, text may be received as inputted text that includes words to be spoken by an animated avatar. The text may be imported from virtually any source, such as from a user device. In some embodiments, the text may be generated by a speech-to-text service that converts spoken words to text.

At 704, the SII service 104B may analyze the text and object tags created by the recognition service 104D. The SII service 104B may perform the analysis to associate a word of the text with a tag of an object included in the virtual environment. For example, the input text may include "I like this desk." The virtual environment may include an object that includes a tag of "desk", "table", and/or other tags. The object may be associated with a known location within the virtual environment relative to a location of an avatar, and may include an object identifier (e.g., "object_desk").

At 706, the SII service 104B may determine object tags associated with the words in the text. In the above example, the tag "desk" may be associated with the word "desk". Other words may be associated with other tags, or possibly with multiple tags. In some instances, a collection or group of objects may include a tag, such as a group of furniture tagged as "office" or a group of objects tagged as "toys" or "books". A word may be associated with multiple tags and possibly multiple objects.

At 708, the SII service 104B may determine object identifiers associated with at least some of the tags for inclusion in metadata and/or in the SMD. For example, the SII service 104B may apply rules to limit a number of objects associated with words to a threshold occurrence since not all words may be used to prompt gestures toward objects. When a word include multiple objects, the SII service 104B may select an object from the multiple objects. In some embodiments, the SII service 104B may store the object identifier in the metadata and/or in the SMD. However, as discussed in FIG. 7B, other information may be stored in the metadata and/or the SMD to enable locating points of interest in the virtual world for use with gestures and/or other interaction depicted by animation of an avatar.

At 710, the SII service 104B may create or update the metadata and/or the SMD to include object identifiers (or other data as discussed below) with associated words. In the example text of "I like this desk", the SII service 104B may insert <object_desk> as metadata in association with the word "desk". The SII service 104B may include an action or other field in the metadata, which may specify an animation action. The action may be determined based on a context of the words. For example, the action may be "touch", "point", "look at", "move toward/away", etc., which may be used by the animation service 104A when creating animations for the avatar.

Figure 7B:
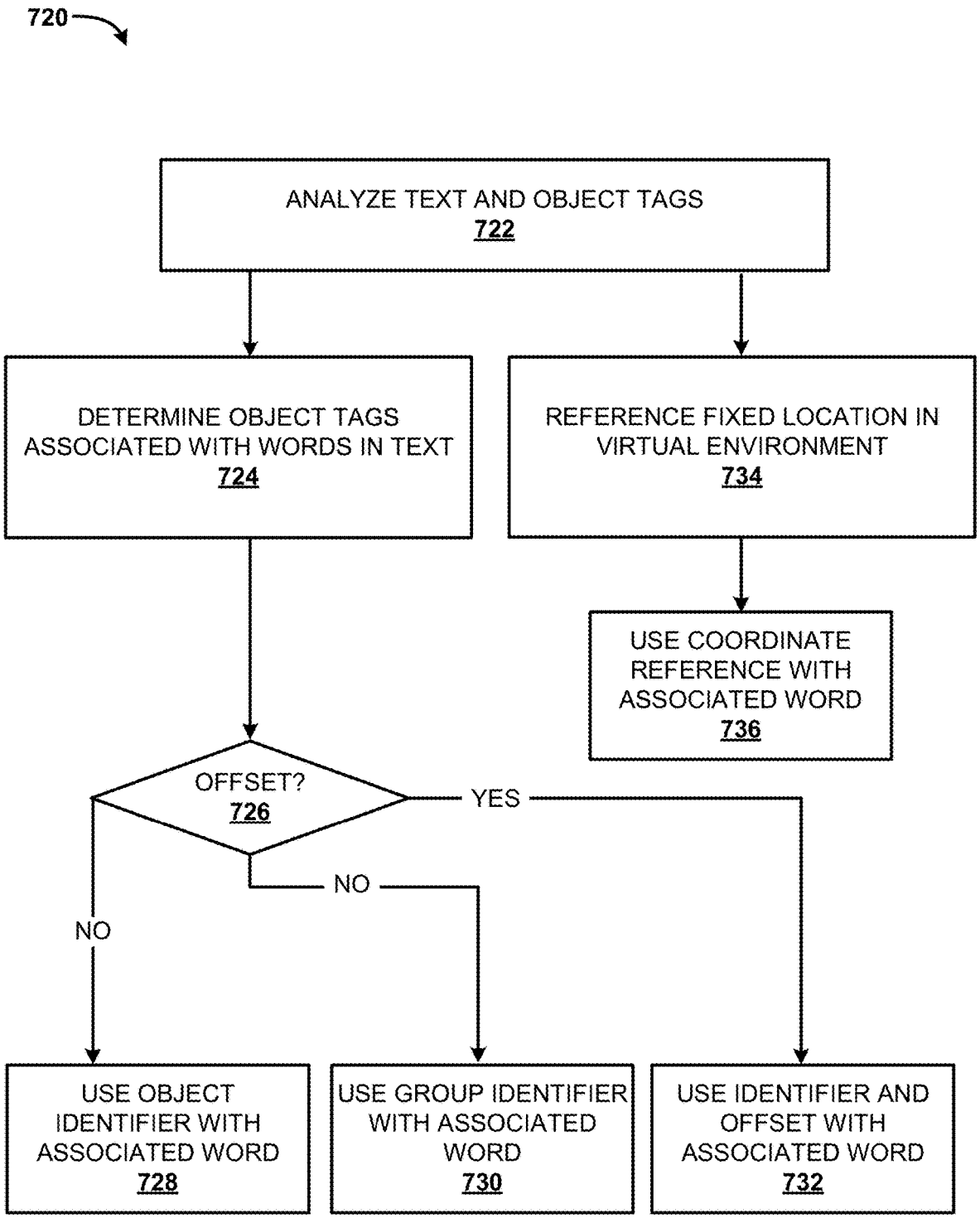
FIG. 7B is a flow diagram showing different ways to create or update speech markup data to include location information.

FIG. 7B is a flow diagram showing an example process 720 including different ways to create or update speech markup data to include location information. The process 720 may be performed in conjunction with the process 700 described above.

At 722, the SII service 104B may analyze the text and object tags created by the recognition service 104D. The SII service 104B may perform the analysis to associate a word of the text with a tag of an object included in the virtual environment. In addition, the analysis may determine a type location to associate with a word, such as a relative location, coordinate reference, or special offset location. The analysis may include groups of objects, which include a shared tag, such as items that form an "office", a collection of "books", and so forth.

At 724, the SII service 104B may determine that object tags are associated with words in the input text. For example, tags of objects in the virtual environment may be compared to words to find associations and/or matches.

At 726, the SII service 104B may determine whether a spatial offset location is used based on the context of the text and the word associated with the object. For example, the text with metadata may include: "right there next to the picture" <object_framed_picture>"on the wall". The words "next to" may be used to create an offset from the location of the "object_framed_picture".

When no offset is used (following the "no" paths from the decision operation 726), the SII service 104B may, at 728, use an object identifier in the metadata in association with the corresponding word and/or at 730, may use a group identifier in the metadata in association with the corresponding word. For example, at 730, the group identifier may include a group "office" that include different furniture items that form an office. During processing by the animation service 104A, the location of the office may be determined, such as by a centroid, a main object, a closest object to the avatar, randomly, and/or in other ways. When an offset is used (following the "yes" path from the decision operation 726), the process 720 may proceed to an operation 732. At 732, the SII service 104B may use an identifier and a spatial offset value/direction in the metadata in association with the corresponding word. The spatial offset value/direction may be determined based on the context of the words, the size of the object, and/or other information, to cause a realistic result. In the example above, the resulting animation generated by processing the metadata may cause an avatar to look to a blank space on the wall to the right of the picture, for example.

When the reference is a fixed location in the virtual environment, the process 720 may proceed to operation 734. At 734, the SII service 104B may determine to use a fixed location in the virtual environment for a reference in metadata. For example, the input text may include words such as "in the center of the room", which may be used by the SII service 104B to create a coordinate system location in metadata for association with the word "center". The coordinate system may be a Cartesian system or other type of coordinate system. At 736, the fixed location may be added to metadata in association with the word.

Figure 8A:
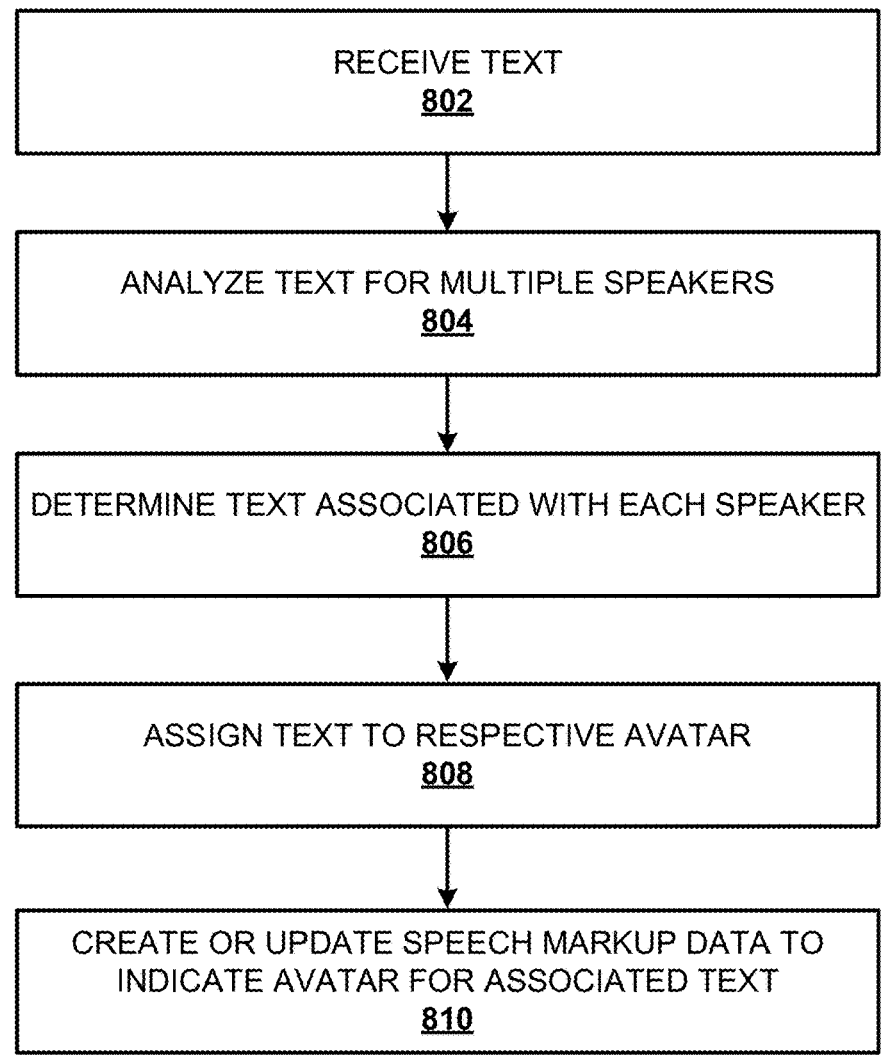
FIG. 8A is a flow diagram showing a routine illustrating aspects of a mechanism disclosed herein for input by the speech input ingestion to identify different speakers for text to be animated by different avatars.

FIG. 8A is a flow diagram showing an example process 800 of a routine illustrating aspects of a mechanism disclosed herein for input by the speech input ingestion to identify different speakers for text to be animated by different avatars.

At 802, text may be received as inputted text that includes words to be spoken by multiple animated avatars. The text may be imported from virtually any source, such as from a user device. In some embodiments, the text may be generated by a speech-to-text service that converts spoken words to text. As discussed below, some words of the input text may be associated with a first avatar and used to create audio and animations for the first avatar while other words may be associated with a second avatar and used to create audio and animations for the second avatar. However, the process 800 may accommodate use of more avatars and text with words associated with more than two avatars.

At 804, the SII service 104B may analyze the input text to determine that the words of the text are for speech/animation for multiple avatars, such as a first avatar and a second avatar. For example, the input text may include labels that indicate words for the different avatars, such as text of a play. In some embodiments, the SII service 104B may analyze the context of the words to determine that the words include dialog between two or more avatars.

At 806, the SII service 104B may determine text that is associated with speaker (avatar). For example, the SII service 104B may determine that first words of the text are associated with a first speaker (first avatar) and second words of the text are associated with a second speaker (second avatar). The first words and second words may be part of multiple groups of words, which create a back and forth dialog between the speakers. A temporal arrangement of the words may be generally provided by the text, such as by the order of the words in the text.

At 808, the SII service 104B may assign words of the text to the respective avatar for processing. The avatars may be selected based on availability in the virtual environment, received user selection, random selection, historical use, and/or using other techniques. For example, the first words may be assigned to the first avatar (adult male voice, tone=low, etc.), while the second words may be assign to a second avatar (child female voice, tone=high, etc.).

At 810, the SII service 104B may create or update metadata and/or the SMD to indicate the avatar for the associated words of the text. For example, start/stop notations may be included in the text, such as: <avatar_1>"Hi"</avatar_1><avatar_2>"great to see you!"</avatar_2>. In some embodiments, the text may be parsed to create different grouping of text for each avatar, and may be processed accordingly. By processing the text in groups using the text-to-speech service, the services may efficiently and/or effectively provide different character audio data and animations, and then replay the ordered animations in a virtual environment as an output. Besides providing different sounding voices, the service may output audio with different three-dimensional sound effects and/or provide other outputs to create an immersive virtual environment based on information such as a location of the avatars in the virtual environment and/or other information.

Figure 8B:
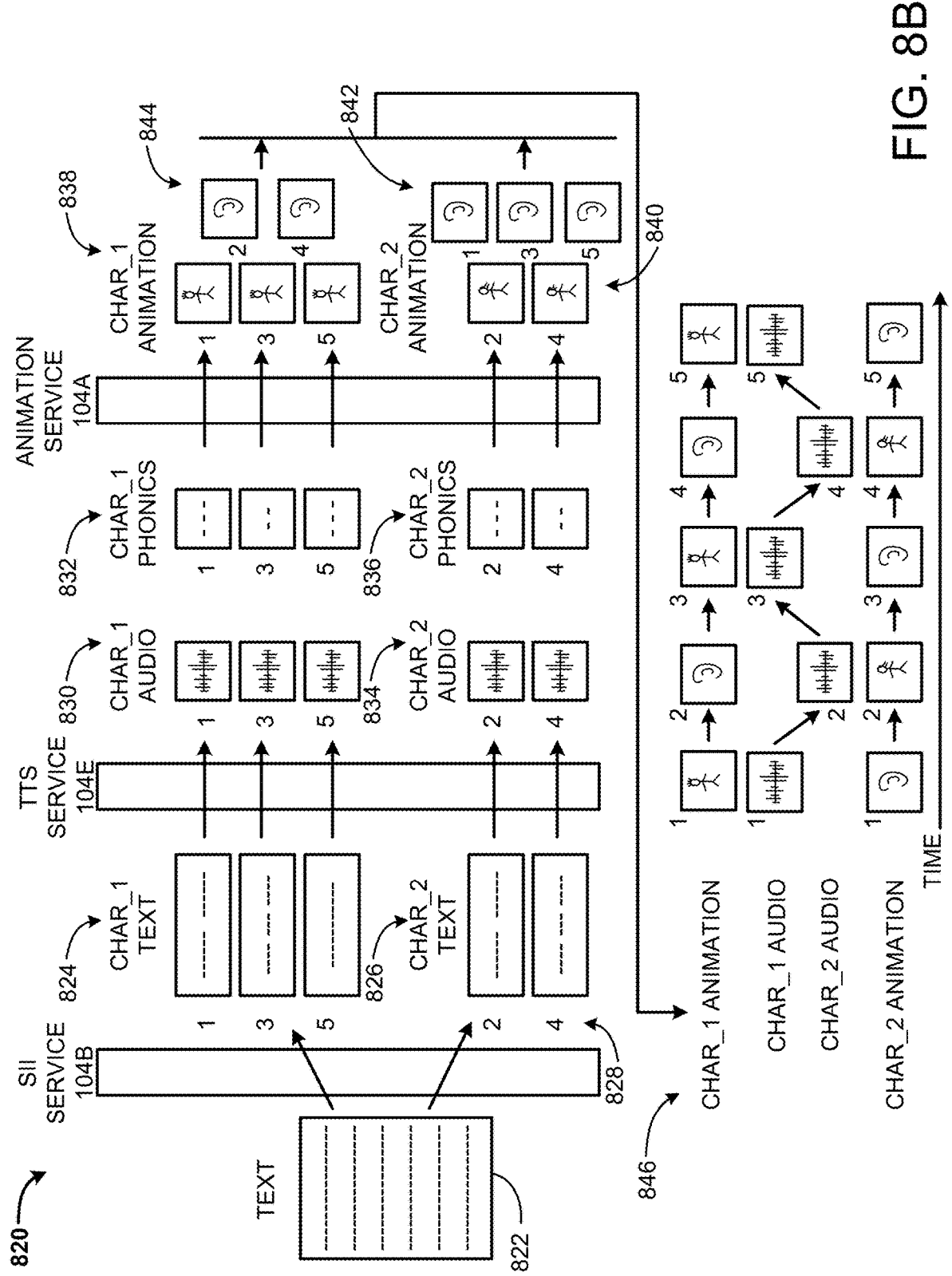
FIG. 8B is a schematic diagram showing processing of text to create animations and audio for different avatars.

FIG. 8B is a schematic diagram 820 showing processing of text to create animations and audio for different avatars. Input text 822 may include text associated with different speakers (different avatars). For example, the input text 822 may include a dialog that include two or more speakers, such as dialog between different avatars. This input text may include cues that enable determination of which words are associated with which speaker. The input text 822 may be processed by the SII service 104B, as described above, to determine first words 824 of the input text 822 associated with a first character ("char_1 text") and a second words 826 of the input text 822 associated with a second character ("char_2 text"). The first words 824 and the second words 826 may be associated with a temporal indicator 828, which may indicate a relative location of the words in the input text 822, such as for temporal arrangement of the words or groups thereof. For illustration purposes, the first words and second words are shown in separate blocks; however, the system may not actually make separate files for each or otherwise segment the data in this way. However, as explained below, there are benefits to segmenting the data, such as to enable creating gaps and transitions between different speaking animations of avatars.

The first words 824 may be processed by the text-to-speech service 104E, as discussed above, to create first audio data ("char_1_audio") 830 and first phonics ("char_1_phonics") 832. The second words 826 may be processed by the text-to-speech service 104E, as discussed above, to create second audio data ("char_2_audio") 834 and second phonics ("char_2_phonics") 836. The first audio data 830, the first phonics 832, the second audio data 834, and the second phonics 836 may each be associated with respective temporal indicators 828 to continue to indicate the relative location of the data with respect to counterpart data (other audio data, other phonic data).

At least the first phonic data 832 and the second phonic data 836 may be processed by the animation service 104A, as discussed above, to create first speaking animations 838 and second speaking animations 840, respectively. In some embodiments, at least the first phonic data 832 may be used to create second listening animations 842 for the second character (second avatar), while at least the second phonic data 836 may be used to create first listening animations 844 for the first character (first avatar). In some embodiments, the first words 824 and the second words 826 may also be used to create the speaking animations and/or the listening animations, such as when context of the words may be used to determine emotions, reactions, interaction with objects (possibly via metadata associated with the words), and so forth. In various embodiments, the first words and second words may be analyzed prior to or during processing by the text-to-speech service 104E to expedite processing and generation of animations, for example. The first speaking animations 838, the second speaking animations, 840, the second listening animations 842, and the first listening animations 844 may each be associated with respective temporal indicators 828 to continue to indicate the relative location of the data with respect to counterpart data (other animation data, etc.).

The animations, including at least the speaking animations and possibly the listening animations, as well as the audio data may then be arranged for playback in accordance with the temporal indicator 828, as shown in the playback arrangement 846. The playback arrangement may include inserted gaps and/or delays in audio and/or animation to accommodate changes in speaker (change from first avatar speech to second avatar speech, etc.). The audio may be created as three-dimensional audio, which may use information about the location of the character (avatar) in the virtual environment when creating or modifying the sound.

Although the diagram 820 shows the words split or parsed in to separate groups for separate processing (possibly parallel processing), the system may be implemented to process the text in a single file by segmenting portions of the file and creating appropriate gaps in the audio data to accommodate transitions between characters actions and speech, for example.

Figure 9A:
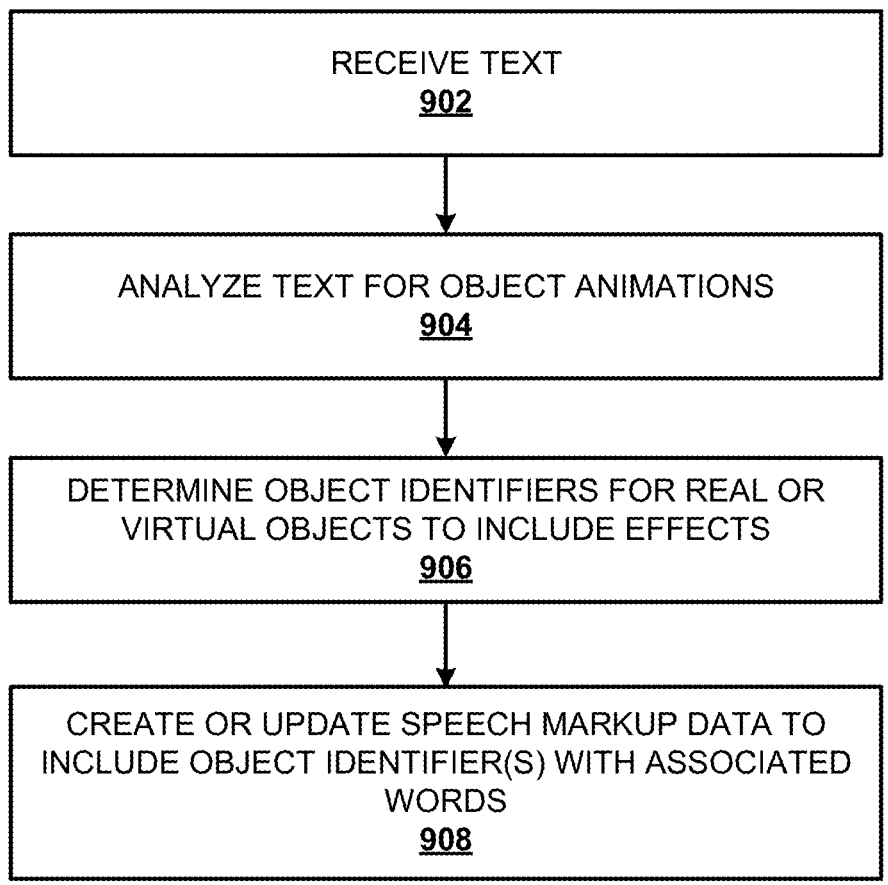
FIG. 9A is a flow diagram showing a routine illustrating aspects of a mechanism disclosed herein for input by the speech input ingestion to identify objects having animations or effects.

FIG. 9A is a flow diagram showing an example process 900 including a routine illustrating aspects of a mechanism disclosed herein for input by the speech input ingestion to identify objects having animations or effects.

At 902, text may be received as inputted text that includes words to be spoken by one or more avatars. The text may be imported from virtually any source, such as from a user device. In some embodiments, the text may be generated by a speech-to-text service that converts spoken words to text.

At 904, the SII service 104B may analyze the text and object tags created by the recognition service 104D. The SII service 104B may perform the analysis to determine effect and/or animation of virtual objects in the virtual environment. For example, the input text may include a description of turning a light on, moving an object, and/or interacting with an object in other ways to cause an effect of the object (e.g., movement of the object, change in state, emission of sound and/or light, etc.). In some embodiments, the system may include real world devices, such as IoT devices, which may be activated to create an immersive effect for a user, such as by turning on/off lights, emitting sound, cause emission of fragrance, activating/deactivating a haptic device, and so forth. The SII service 104B may identify words associated with, and used to trigger, such virtual object effects and/or real world devices.

At 906, the SII service 104B may determine object identifiers for virtual objects and/or real world devices that include effects associated with words in the input text. For example, the words "turn on the light" may be associated with the effect of having a light turn on in the virtual environment and a real light turn on (via transmission of a signal to a real light) in the real world. To determine the objects, the SII service 104B may use tags as discussed above, such as by associating or matching words in the input text with available tags.

At 908, the SII service 104B may create or update the metadata and/or the SMD to include the object identifiers (or other data as discussed below) with associated words. In the example text of "turn the light on", the SII service 104B may insert <object_light, on> as metadata in association with the word "light". The SII service 104B may include an action or other field in the metadata, which may specify an animation action or effect (here, to turn a light on). The action may be determined based on a context of the words. Actions may include changes in location (movement), changes in light (turn on/off), sound (object makes noise like a tree falling down), and so forth. In various embodiments, the animations may create to effects of the objects. For example, if an object effect is a tree falling down, the animation service may cause an avatar to jump out of the way as a reaction animation, for example.

Figure 9B:
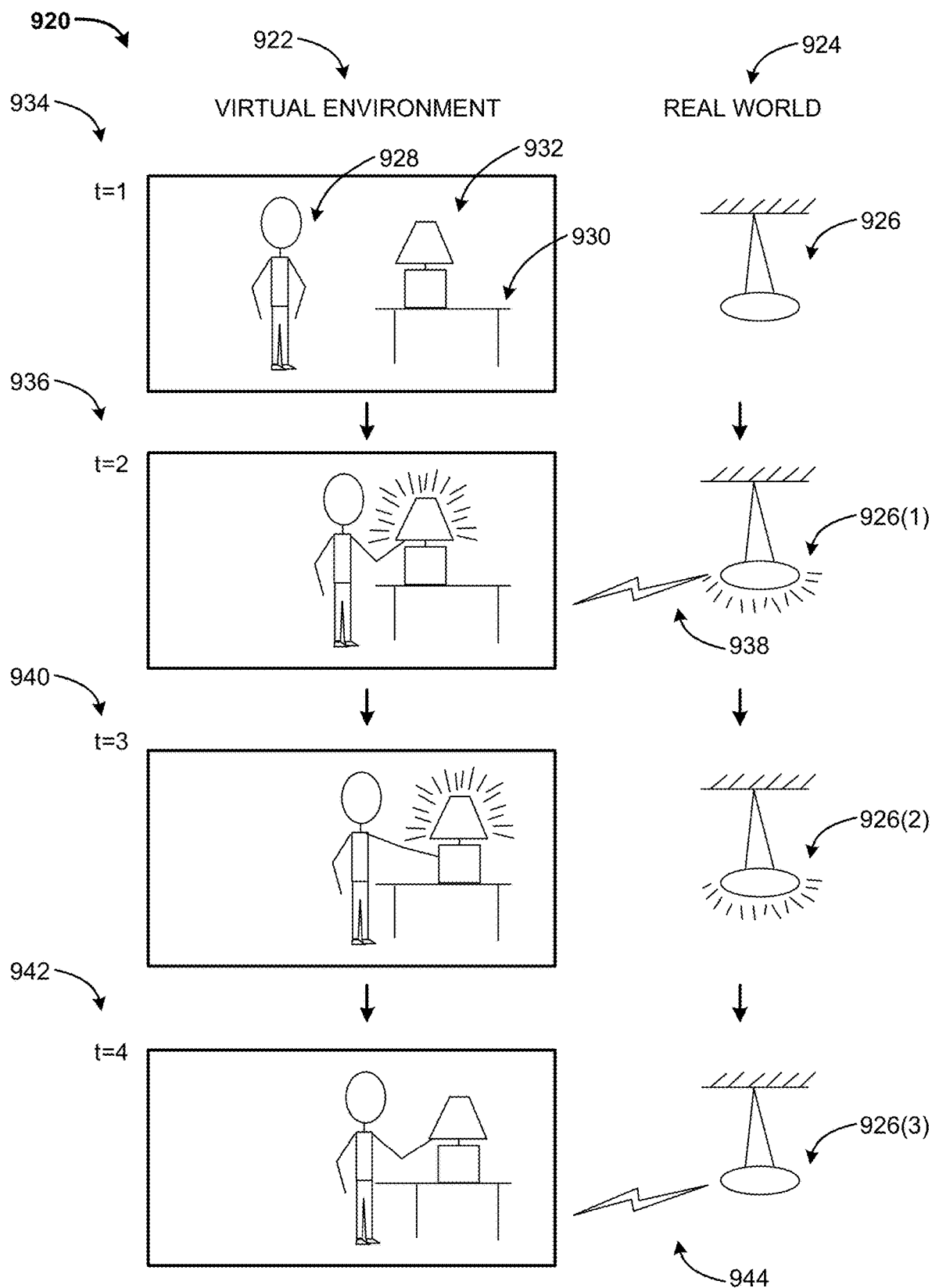
FIG. 9B is a schematic diagram showing example manipulation of virtual and real objects over time in a virtual environment and a real world environment, respectively.

FIG. 9B is a schematic diagram 920 showing example manipulation of virtual and real objects over time in a virtual environment and a real world environment, respectively. The diagram 920 shows a virtual reality environment 922 generated using one or more of the services discussed above, such as the animation service, the virtual platform service, and so forth. The diagram 920 also shows a real world device, such as an IoT device 926. The IoT device 926 may be a light that can be actuated by a signal from one or more of the services discussed herein, and as a result of processing metadata created by the SII service 104B.

The virtual environment may include an avatar 928, a first object 930, and a second object 932. Here, the second object may include effects and/or animations consistent with movement and operation of a desk lamp. The animations of the avatar and object(s) may be generated by input text, such as example text: "I'm going to turn on this lamp, move it, and then turn it off". The SII service 104B may create metadata to include object effects. For example, the metadata may include effects such as <object_lamp, on>, <object_lamp move {x, y, z} to {x1, y1, z1}>, <object_lamp, off>.

At a first time t=1 934, the avatar animate and speak, such as "I'm going to turn on this lamp".

At a second time t=2 936, the animation service 104A may cause the avatar to touch the lamp based at least in part on the metadata <object_lamp, on>, such as by applying rules from a ruleset that has animations for the particular object and set of metadata (turn light on, etc.). The animation service 104A may then cause the light to appear to emit light as if the light were "on". Meanwhile, a service may send a signal 938 to cause the IOT device 926 to turn on, depicted in FIG. 9B as 926(1). The signal may be a wired or wireless signal, for example.

At a third time t=3 940, the animation service 104A may cause the avatar to animate and speak audio data such as "move it" and move the lamp based at least in part on the metadata <object_lamp move {x, y, z} to {x1, y1, z1}>. The animation service 104A may then cause the light to move from a first location {x, y, z} to a second location{x1, y1, z1}. Meanwhile, the IOT device 926 may remain on, depicted in FIG. 9B as 926(2). The signal may be a wired or wireless signal, for example. The animation service may cause a location of a hand of the avatar to move with the second object 932 (the lamp), or vice versa to create an appearance that the avatar moves the lamp.

At a fourth time t=4 942, the animation service 104A may cause the avatar to touch the lamp based at least in part on the metadata <object_lamp, off, such as by applying rules from a ruleset that has animations for the particular object and set of metadata (turn light off, etc.). The animation service 104A may then cause the light to appear to stop emitting light as if the light were "off". Meanwhile, a service may send a signal 944 to cause the IOT device 926 to turn off, depicted in FIG. 9B as 926(3).

Figure 10B:
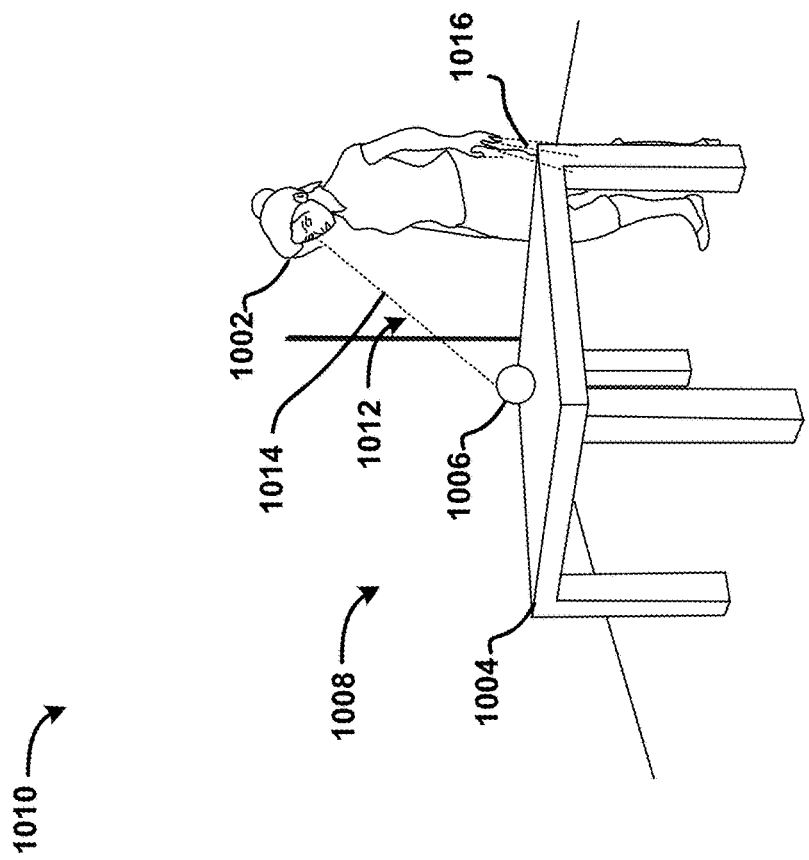
FIGS. 10A and 10B are schematic diagrams of an illustrative avatar interacting with a virtual object.
Figure 10A:
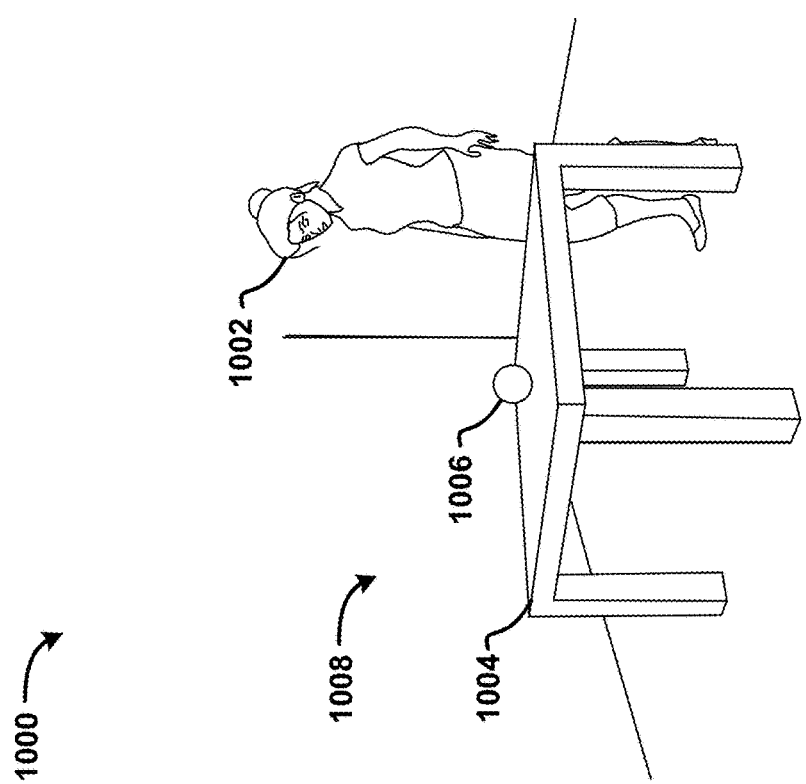

FIGS. 10A and 10B are schematic diagrams of an illustrative avatar interacting with a virtual object. FIG. 10A shows a schematic diagram 1000 that includes an avatar 1002, a first object 1004, and a second object 1006 located in a virtual environment 1008. The avatar 1002 may be animated to speak and provide gestures using animation sequences described above, which may be generated based on text, such as text input by a user.

The virtual environment 1008 may include some or many objects, such as the first object 1004 and the second object 1006. The virtual environment may also include one or more avatars, such as the avatar 1002 and possibly other avatars. The avatar 1002 may be animated based on inputted text to animate speaking the text and performing gestures. In some examples, other avatars may be animated to listen to the avatar 1002 and/or perform gestures in reaction to the speech by the avatar 1002, for example.

In various examples, the objects in the environment 1008 may be processed by the recognition service 104D to create tags. The tags may include keywords and/or other information that describes the objects, relationships between the objects, locations of the objects, and/or other relevant information. For example, the first object 1004 may include tags such as "table", "brown", "wood", "brand x", etc., while the second object 1006 may include tags such as "orange", "round", "fruit", etc. Relationships and positions/locations of the objects may be included in the tags or determined by analysis of the environment, possibly using the recognition service 104D. For example, the recognition service 104D may determine, by analyzing the environment, that the "orange" is located on top of the "table". This information may be used when generating animation sequences for gestures by the animation service 104A. For example, when the text to be spoken by the avatar mentions an "orange", the word "orange" may be linked to a tag associated with the second object 1006. An animation sequence may be generated to depict the avatar 1002 to gesture toward the second object 1006 during animation synchronized with playback of audio data (e.g., the speaking of the word "orange" in this example).

FIG. 10B shows a schematic diagram 1010 that includes the avatar 1002 having illustrative pointers 1012 projected from avatar features. The pointers 1012 may include a sightline pointer 1014 associated with a direction that the avatar is depicted to look toward. The pointers may include finger pointers 1016 associated with a direction of each finger or other appendage of the avatar. For example, each hand may have up to five pointers when the fingers are extended, but may have less pointers if fewer fingers are extended (and thus are not likely pointing at anything). The pointers 1012 may be used with other skeletal components of the avatar, such as legs, feet, arms, and/or hands. The pointers 1012 may be used for reference purposes, and may not be rendered for display to a user. For example, when the avatar is animated to gesture toward the second object 1006, the animation sequence may depict the avatar in such a way that the sightline pointer is directed toward the second object 1006. When the animation sequence generates animation sequences to motion toward an object via animation of a hand of the avatar, at least some of the finger pointers 1016 may generally point toward the object.

Figure 11A:
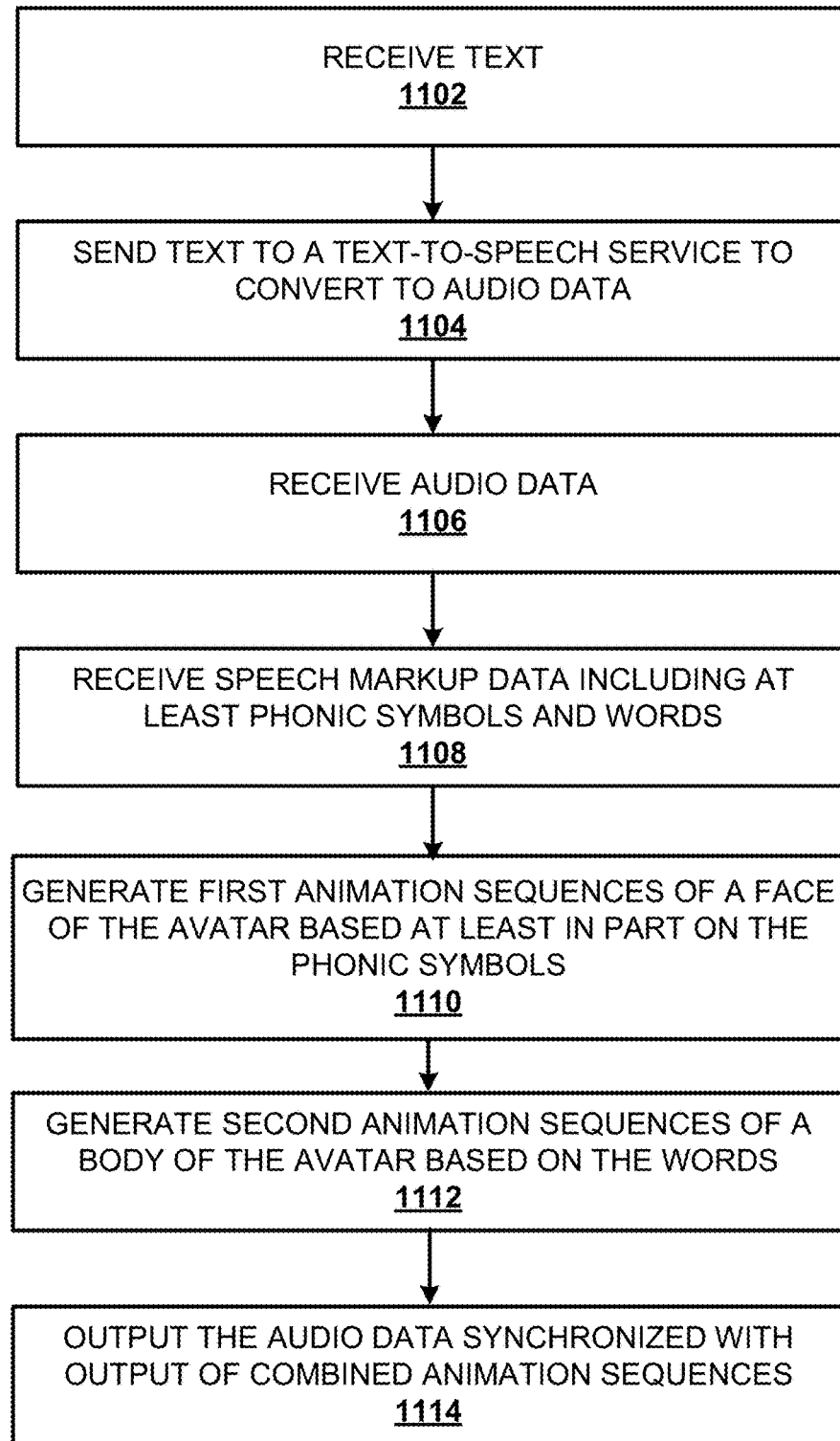
FIG. 11A is a flow diagram showing a routine illustrating aspects of a mechanism disclosed herein for generating animation based on inputted text.

FIG. 11A is a flow diagram showing a routine 1100 illustrating aspects of a mechanism disclosed herein for generating animation based on inputted text.

At 1102, the animation service 104A may receive text. The text may be received from a user or from another source, such as a prewritten document. The text may include words that are to be spoken by an avatar that is animated and performs gestures during speaking of the text, where the gestures are associated with a context of the text.

At 1104, the animation service 104A may send text to the text-to-speech service 104E and/or the ASR service 104F to generate audio data and speech markup data. The audio data may include speech audio of the text. The audio data may be generated to create specific sound profiles of a speaker, such as a male voice, a female voice, a deep voice, a high pitched voice, a sad voice, an excited voice, and/or other variations or combinations thereof. The speech markup data may include at least one or more phonic symbols, one or more words, and one or more time codes. The one or more time codes may indicate a time of occurrence of the one or more phonic symbols and the one or more words during playback of the audio data. In some examples, the text may include and/or be associated with at least some markup data before the text is sent to the text-to-speech service 104E and/or the ASR service 104F. For example, markups and/or other information may be added to the text, which may be used by the animation service 104A and/or other services discussed herein.

At 1106, the animation service 104A may receive the audio data with the text. For example, the animation service 104A may receive the audio data as an audio file (e.g., .mp3 file, WAV file, or other file type).

At 1108, the animation service 104A may receive the speech markup data including at least the phonic symbols, the words, and the time codes. For example, the speech markup data may be received as structured data in database or other repository enabling extraction of components of the data.

In some examples, when the system includes the text to the speech service 104E and/or the ASR service 104F as local services, the operations 1104 to 1108 may include determining, using the text-to-speech service 104D, audio data associated with the text and determining speech markup data including at least one or more phonic symbols, one or more words, and one or more time codes. The one or more time codes may indicate a time of occurrence of the one or more phonic symbols and the one or more words during playback of the audio data.

At 1110, the animation service 104A may generate one or more first animation sequences of facial features, such as a mouth, of the avatar based at least in part on the one or more phonic symbols and the time codes associated with the phonic symbols.

At 1112, the animation service 104A may generate one or more second animation sequences of a body of the avatar based at least in part on the one or more words and the time codes associated with the words. The animation sequences may drive animation/movement of skeletal components, which may then be rendered with textures mapped to the skeletal components to depict skin, clothing, etc. In some examples, at least some of the second animation sequences may be based on at least some of the phonic symbols. For example, a certain phonic symbol may be used as a trigger or keyword to initiate a certain gesture depicted by movement/animation of the body of the avatar. In various examples, words may be associated with an idiom, and the second animation sequences may include a predetermined gesture to visually communicate the idiom.

At 1114, the animation service 104A may output the audio data synchronized with output of combined animation sequences of the avatar that include the one or more first animation sequences and the one or more second animation sequences. The output may be a file, such as a downloadable animation file that includes the animation, the sound, or both. In various examples, the combined animation sequences may include a blending of a first animation sequence and a second animation sequence to create at least part of the second gesture sequence. The output may include a virtual environment that includes at least one object in the virtual environment along with the avatar. The virtual environment may include another avatar and/or other objects, which may be associated with tags as discussed above.

Figure 11B:
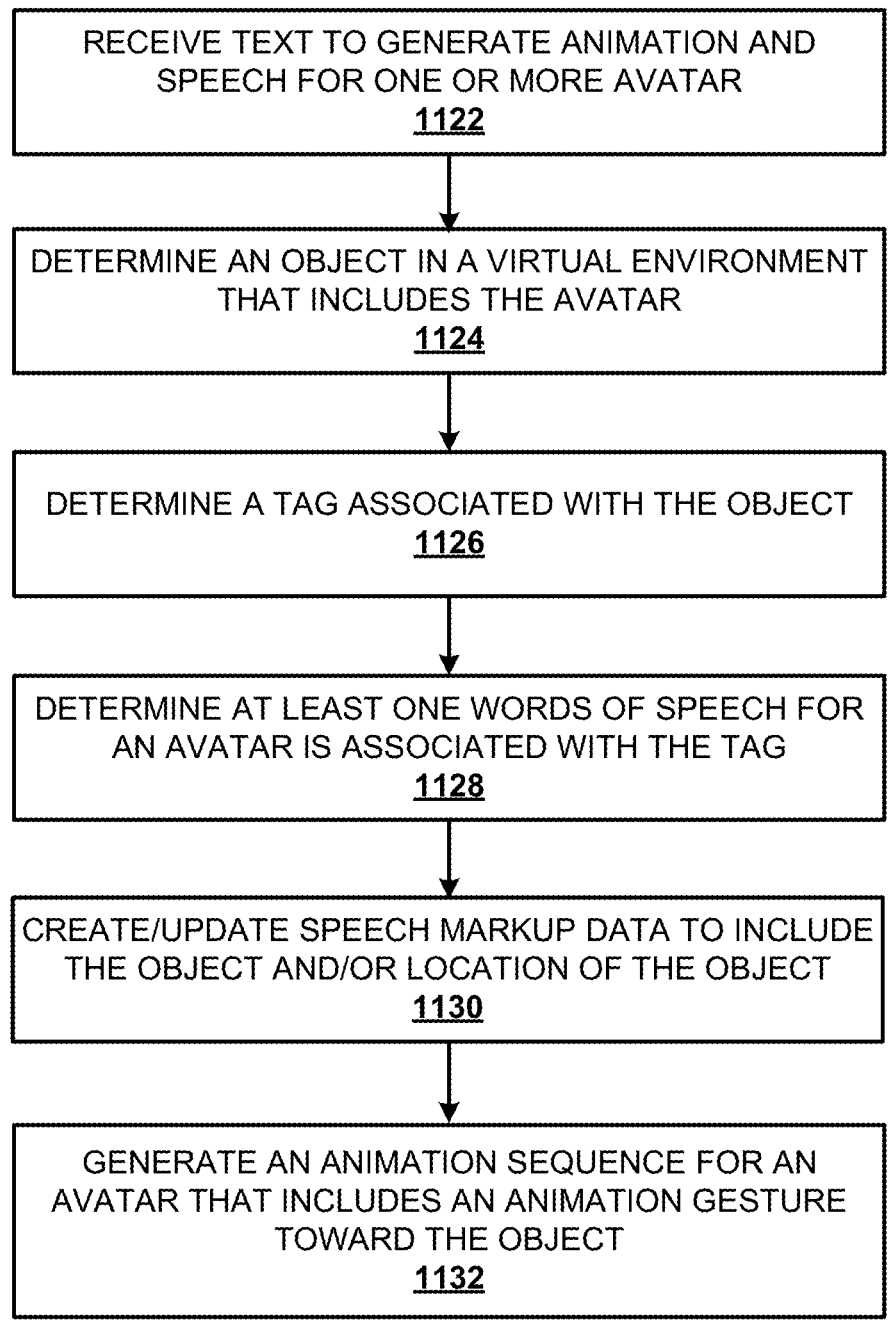
FIG. 11B is a flow diagram showing a routine illustrating aspects of a mechanism disclosed herein for generating speech markup data and animation sequences to gesture toward a location based on tags of the virtual objects.

FIG. 11B is a flow diagram 1120 showing a routine illustrating aspects of a mechanism disclosed herein for generating speech markup data and animation sequences to gesture toward a location based on tags of the virtual objects.

At 1122, input text may be received that is used to generate animation and/or speech for one or more avatars, as discussed above. The input text may be at least partially processed by the SII service 104B, such as to determine whether the text include dialog for multiple speakers (e.g., as described in the FIG. 8A).

At 1124, the SII service 104B may determine an object in a virtual environment, where the virtual environment includes the avatar. For example, objects in the virtual environment may be tagged by the recognition service 104D to provide information about the objects, including names, description and possibly location information.

At 1126, the SII service 104B may determine one or more tags of the object in the virtual environment. For example, a word "fruit" may be associated with an object in the virtual environment that is tagged with a description of "orange" and/or "fruit".

At 1128, the SII service 104B may determine a word in the input text that is associated with the tag. For example, the input text may include the words "I am hungry for an orange and want to eat that one." The word "orange" and/or the word "one" may be associated with the tag "orange", and possibly to the object identifier of the corresponding object.

At 1130, the SII service 104B may create metadata to provide the object identifier in association with the word "orange", as discussed above. For example, the SII service 104B may create metadata that include the word "orange" and an object identifier <object_orange_id>, for example. The object identifier may be used by the animation service to cause the avatar to gesture toward the object (the orange) or otherwise interact with the object.

At 1132, the animation service 104A may generate animation sequences that include an animation gesture toward the object associated with the tag. For example, the second animation sequences may depict the avatar gesturing toward the object (the orange) in the virtual environment during playback of the word associated with the object, such as gesturing toward a virtual piece of fruit as the avatar speaks the word "orange."

Figure 12:
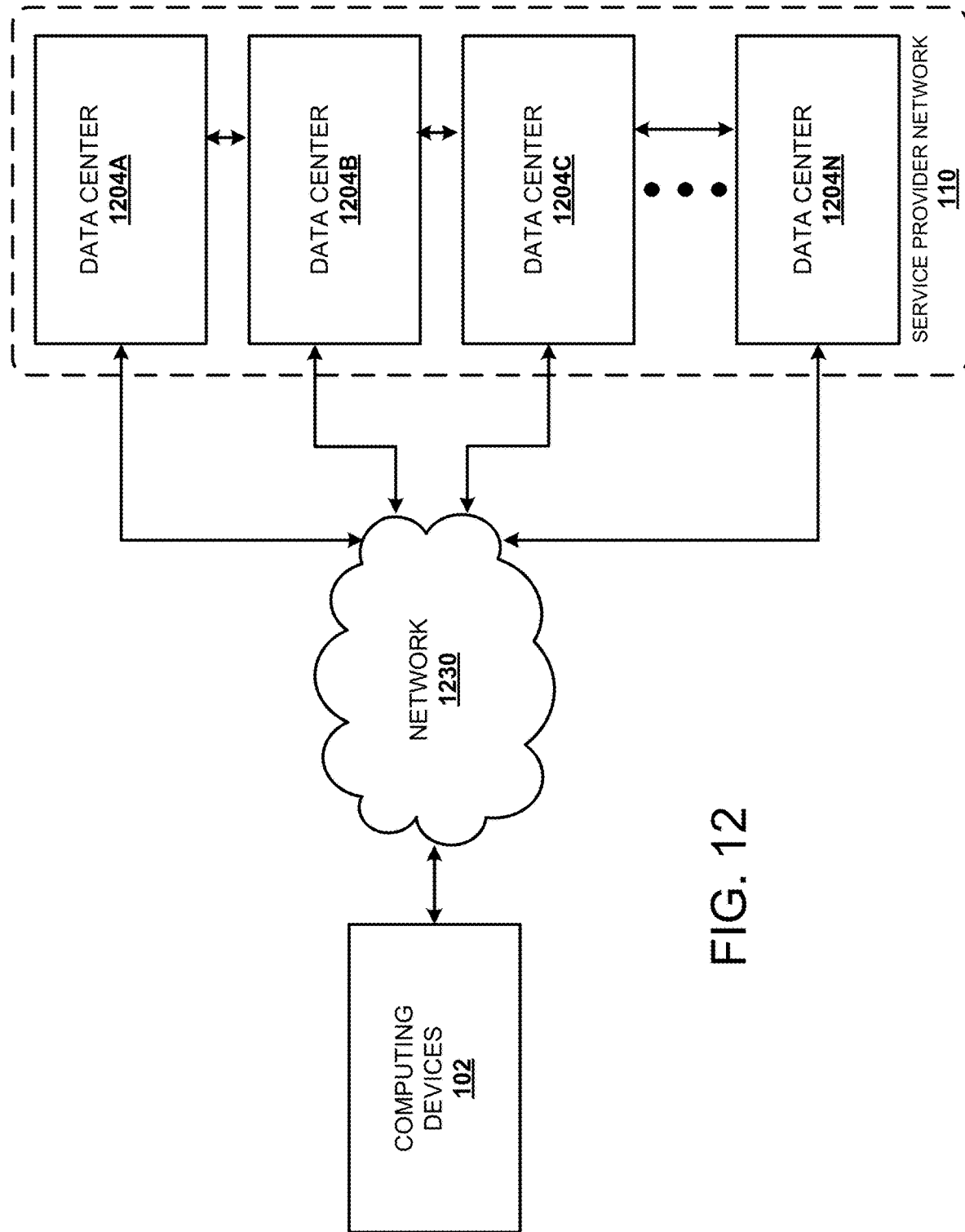
FIG. 12 is a system and network diagram that shows one illustrative operating environment for the examples disclosed herein that includes a service provider network.

FIG. 12 and the following description are intended to provide a brief, general description of a suitable computing environment in which the examples described herein may be implemented. In particular, FIG. 12 is a system and network diagram that shows an illustrative operating environment that includes a service provider network 110. As discussed above, service provider network 110 can provide virtual machine instances and computing resources on a permanent or an as-needed basis.

The computing resources provided by the service provider network 110 may include various types of resources, such as data processing resources, data storage resources, networking resources, data communication resources and the like. Each type of computing resource may be general-purpose or may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by service provider network 110 are enabled in one implementation by one or more data centers 1204A-1204N (which may be referred to herein singularly as "a data center 1204" or collectively as "the data centers 1204"). The data centers 1204 are facilities utilized to house and operate computer systems and associated components. The data centers 1204 typically include redundant and backup power, communications, cooling and security systems. The data centers 1204 might also be located in geographically disparate locations. One illustrative configuration for a data center 1204 that implements some or all of the concepts and technologies disclosed herein will be described below with regard to FIG. 13.

The users and customers of service provider network 110 may access the computing resources provided by the data centers 1204 over a suitable data communications network, such as a Wide Area Network ("WAN"), as illustrated by network 1230. Although a WAN might be used, it should be appreciated that a local-area network ("LAN"), the Internet, or any other networking topology known in the art that connects the data centers 1204 to the computing devices 102 may be utilized. It should also be appreciated that combinations of such networks might also be utilized.

Figure 13:
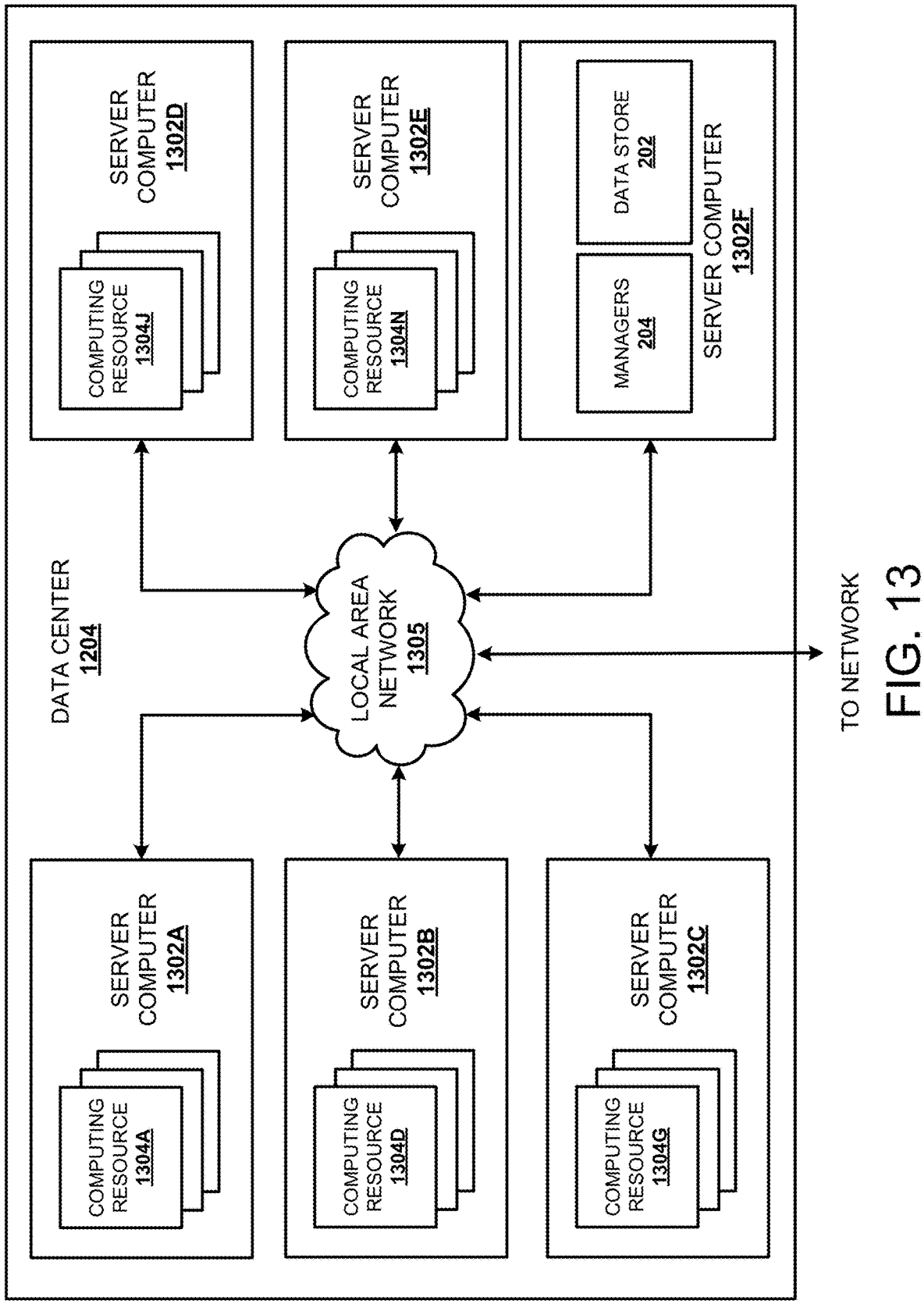
FIG. 13 is a computing system diagram that illustrates one configuration for a data center that implements aspects of a service provider network, including some or all of the concepts and technologies disclosed herein in which a VR/AR application interacts with different services.

FIG. 13 is a computing system diagram that illustrates one configuration for a data center 1204 that implements aspects of a service provider network 110, including some or all of the concepts and technologies disclosed herein in which a framework is used to provide VR applications and/or AR applications to access to different services. The example data center 1204 shown in FIG. 13 includes several server computers 1302A-1302F (which may be referred to herein singularly as "a server computer 1302" or in the plural as "the server computers 1302") for providing computing resources. The server computers 1302 may be standard tower or rack-mount server computers configured appropriately for providing the computing resources described herein. According to an example, the server computers 1302 are configured to execute the software products as described above.

In an example, some of the computing resources 1304 are virtual machine instances. As known in the art, a virtual machine instance is an instance of a software implementation of a machine (i.e. a computer) that executes programs like a physical machine. Each of the server computers 1302 may be configured to execute an instance manager (not shown) capable of instantiating and managing computing resources and instances of computing resources. In the case of virtual machine instances, for example, the instance manager might be a hypervisor or another type of program configured to enable the execution of multiple virtual machine instances on a single server computer 1302, for example.

It should be appreciated that although the examples disclosed herein are described primarily in the context of virtual machine instances, other types computing resources can be utilized with the concepts and technologies disclosed herein. For instance, the technologies disclosed herein might be utilized with hardware resources, data storage resources, data communications resources, networking resources, database resources and with other types of computing resources.

The data center 1204 shown in FIG. 13 also includes a server computer 1302F reserved for executing software components for managing the operation of the data center 1204, the server computers 1302, virtual machine instances, and other resources within the service provider network 110. The server computer 1302F might also execute the manager 114 and include the data store 202. Details regarding the operation of each of these components has been provided above. In this regard, it should be appreciated that while these components are illustrated as executing within service provider network 110, computing systems that are external to service provider network 110 might also be utilized to execute some or all of these components. Other configurations might also be utilized.

In the example data center 1204 shown in FIG. 13, an appropriate local area network ("LAN") 1305 is utilized to interconnect the server computers 1302A-1302E and the server computer 1302F. The LAN 1305 is also connected to the network 1230 illustrated in FIG. 12. It should be appreciated that the configuration and network topology illustrated in FIGS. 12 and 13 has been greatly simplified and that many more computing systems, networks and networking devices may be utilized to interconnect the various computing systems disclosed herein. Appropriate load balancing devices or software modules might also be utilized for balancing a load between each of the data centers 1204A-1204N, between each of the server computers 1302A-1302F in each data center 1204 and between virtual machine instances and other types of computing resources provided by the service provider network 110.

It should be appreciated that the data center 1204 described in FIG. 13 is merely illustrative and that other implementations might also be utilized. Additionally, it should be appreciated that the functionality provided by these components might be implemented in software, hardware, or a combination of software and hardware. Other implementations should be apparent to those skilled in the art.

Figure 14:
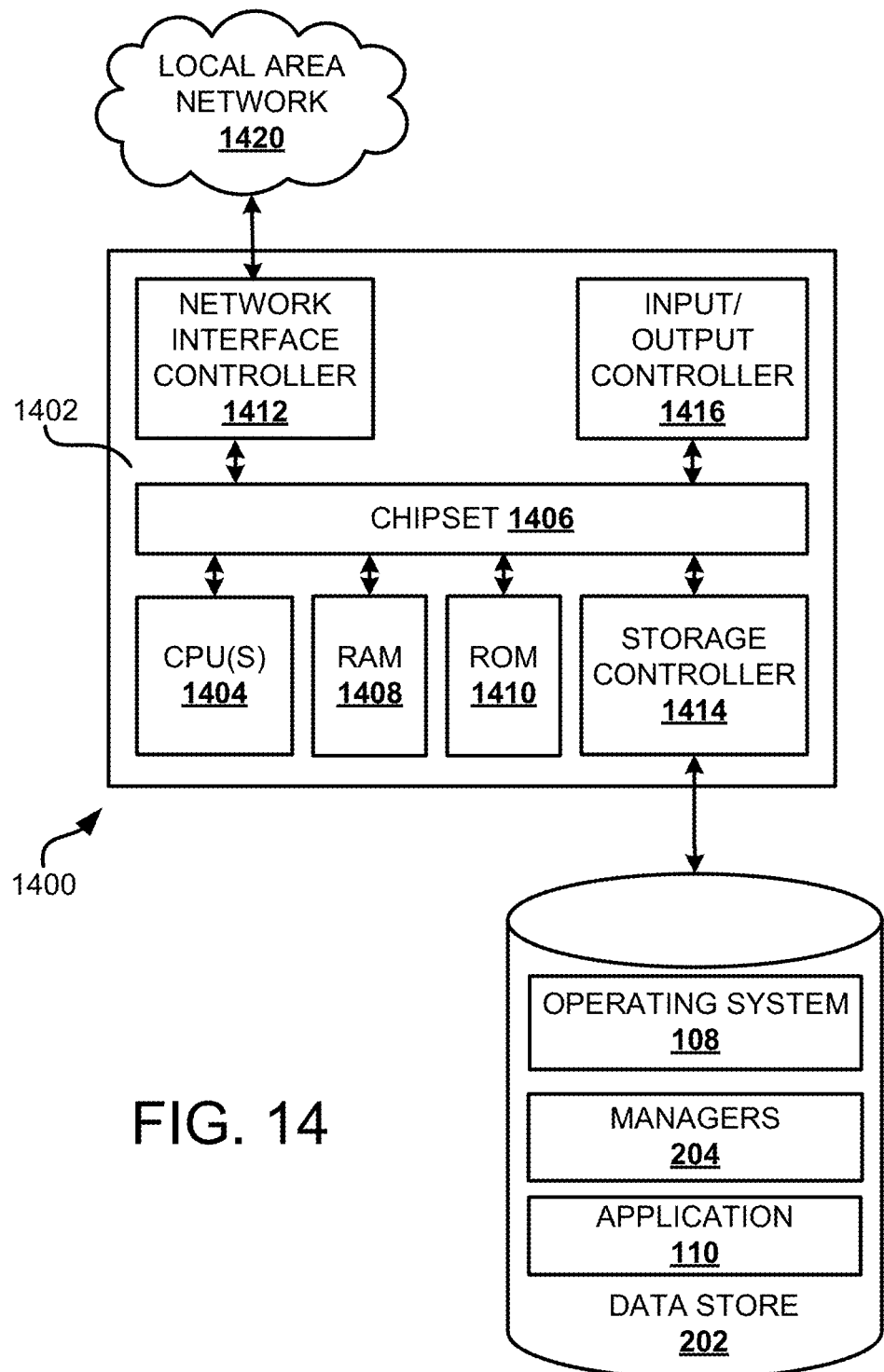
FIG. 14 is a computer architecture diagram showing one illustrative computer hardware architecture for implementing a computing device that is configured to implement aspects of the various examples presented herein.

FIG. 14 shows an example computer architecture for a computer 1400 capable of executing program components for providing a framework for utilizing different services to interact with VR/AR applications in the manner described above. The computer architecture shown in FIG. 14 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 14 may be utilized to execute software components for performing operations as described above. The computer architecture shown in FIG. 14 might also be utilized to implement a computing device 102, a computing device utilized in the contextual service 104J, the application service 106 or the application execution service 108 or any other of the computing systems described herein.

The computer 1400 includes a baseboard 1402, or "motherboard," which is a printed circuit board to which a multitude of components or devices may be connected by way of a system bus or other electrical communication paths. In one illustrative example, one or more central processing units ("CPUs") 1404 operate in conjunction with a chipset 1406. The CPUs 1404 may be standard programmable processors that perform arithmetic and logical operations necessary for the operation of the computer 1400.

The CPUs 1404 perform operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 1406 provides an interface between the CPUs 1404 and the remainder of the components and devices on the baseboard 1402. The chipset 1406 may provide an interface to a RAM 1408, used as the main memory in the computer 1400. The chipset 1406 may further provide an interface to a computer-readable storage medium such as a read-only memory ("ROM") 1410 or non-volatile RAM ("NVRAM") for storing basic routines that help to startup the computer 1400 and to transfer information between the various components and devices. The ROM 1410 or NVRAM may also store other software components necessary for the operation of the computer 1400 in accordance with the examples described herein.

The computer 1400 may operate in a networked environment using logical connections to remote computing devices and computer systems through a network, such as the local area network 1420. The chipset 1406 may include functionality for providing network connectivity through a network interface controller ("NIC") 1412, such as a gigabit Ethernet adapter. The NIC 1412 is capable of connecting the computer 1400 to other computing devices over the local area network 1420. It should be appreciated that multiple NICs 1412 may be present in the computer 1400, connecting the computer to other types of networks and remote computer systems.

The computer 1400 may be connected to a data store, such as the data store 202, that provides non-volatile storage for the computer. The data store 134 may store system programs, application programs, other program modules and data, which have been described in greater detail herein. The data store 202 may be connected to the computer 1400 through a storage controller 1414 connected to the chipset 1406. The data store 202 may consist of one or more physical storage units. The storage controller 1414 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1400 may store data on the data store 202 by transforming the physical state of the physical storage units to reflect the information being stored. The specific transformation of physical state may depend on various factors, in different implementations of this description. Examples of such factors may include, but are not limited to, the technology used to implement the physical storage units, whether the data store 202 is characterized as primary or secondary storage and the like.

For example, the computer 1400 may store information to the data store 202 by issuing instructions through the storage controller 1414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1400 may further read information from the data store 202 by detecting the physical states or characteristics of one or more particular locations within the physical storage units.

In addition to the data store 202 described above, the computer 1400 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 1400.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The data store 202 may store an operating system 1430 utilized to control the operation of the computer 1400. According to one example, the operating system comprises the LINUX operating system. According to another example, the operating system comprises the WINDOWS® SERVER operating system from MICROSOFT Corporation. According to further examples, the operating system may comprise the UNIX operating system or the ANDROID operating system. It should be appreciated that other operating systems may also be utilized. The data store 202 may store other system or application programs and data utilized by the computer 1400, such as components that include the manager 114, the application 110 and/or any of the other software components and data described above. The data store 202 might also store other programs and data not specifically identified herein.

In one example, the data store 202 or other computer-readable storage media is encoded with computer-executable instructions which, when loaded into the computer 1400, transform the computer from a general-purpose computing system into a special-purpose computer capable of implementing the examples described herein. These computer-executable instructions transform the computer 1400 by specifying how the CPUs 1404 transition between states, as described above. According to one example, the computer 1400 has access to computer-readable storage media storing computer-executable instructions which, when executed by the computer 1400, perform the various routines described above with regard to FIGS. 7-11. The computer 1400 might also include computer-readable storage media for performing any of the other computer-implemented operations described herein.

The computer 1400 may also include one or more input/output controllers 1416 for receiving and processing input from a number of input devices, such as a keyboard, a mouse, a touchpad, a touch screen, an electronic stylus, or other type of input device. Similarly, the input/output controller 1416 may provide output to a display, such as a computer monitor, a flat-panel display, a digital projector, a printer, a plotter, or other type of output device. It will be appreciated that the computer 1400 may not include all of the components shown in FIG. 14, may include other components that are not explicitly shown in FIG. 14, or may utilize an architecture completely different than that shown in FIG. 14.

Based on the foregoing, it should be appreciated that technologies for using a framework that provides VR applications and/or AR applications (hereinafter may be collectively referred to as a "VR/AR application") to access to different services have been presented herein. Moreover, although the subject matter presented herein has been described in language specific to computer structural features, methodological acts and computer readable media, it is to be understood that the invention defined in the appended claims is not necessarily limited to the specific features, acts, or media described herein. Rather, the specific features, acts and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example examples and applications illustrated and described, and without departing from the true spirit and scope of the present invention, which is set forth in the following claims.

What is claimed is:

1. A system comprising:
   a recognition service to:
      determine a first tag associated with a first object and a second tag associated with a second object, the first object and the second object located in a virtual environment;
   a speech input ingestion service to:
      analyze text in speech markup data to determine a word in the text that is associated with at least the first tag or the second tag;
      determine that the word is associated with the first tag of the first object;
      determine an object identifier of the first object;
      create metadata for the object identifier; and
      associate the object identifier in the metadata with the word in the speech markup data;
   a text-to-speech service to:
      process the text to create audio data and phonics for words in the text including the word; and
   an animation service to:

process the phonics to create animations of an avatar, including at least animation of facial features synchronized with playback of the audio data; and process the metadata to cause a first animation of the avatar in the virtual environment in relation to the first object, wherein the process performs acts to:

determine a location of the first object in the virtual environment; and generate the first animation for the avatar to depict the avatar gesturing toward the location associated with the first object at a time associated with output of the word in the audio data.

2. The system as recited in claim 1, wherein the speech input ingestion service further performs acts to:

analyze the text to identify first words associated with the avatar and second words associated with a different avatar; and create additional metadata to associate the first words with the avatar and the second words with the different avatar, wherein the text-to-speech processor processes the first words separate from the second words to create first audio for the avatar from the first words and to create second audio for the different avatar from the second words.

3. The system as recited in claim 1, wherein the animation service causes animation of the first object, the animation of the first object associated with the first animation that includes the avatar gesturing toward the location associated with the first object.

4. The system as recited in claim 1, wherein the tagging service further associates the first object and at least another object as a group of objects based at least in part on tags associated with the first object and the at least another object, and wherein the first tag is associated with the group of objects.

5. The system as recited in claim 1, further comprising a delivery service to generate a signal for transmission to a real-world device, the signal to cause the real-world device to perform a physical action in coordination with playback of the first animation.

6. A non-transitory computer-readable storage medium having computer-executable instructions stored thereupon which, when executed by one or more computing devices, cause the one or more computing devices to:

determine a tag associated with an object located in a virtual environment;

analyze text, in speech markup data, to be spoken by an avatar during animation of the avatar in the virtual environment;

determine that a word in the text is associated with the tag of the object;

determine an identifier of the object, the identifier being associated with metadata;

associate the identifier with the word;

determine audio data and one or more phonics for one or more words in the text including the word;

determine, based at least in part on the one or more phonics, one or more animations of the avatar, the one or more animations including animation of one or more facial features synchronized with playback of the audio data; and cause, based at least in part on the metadata, an animation of the avatar in the virtual environment in relation to the object, wherein causing the animation of the avatar comprises:

determining a location of the object in the virtual environment; and generating the animation for the avatar to depict the avatar gesturing toward the location associated with the object at a time associated with output of the word in the audio data.

7. The non-transitory computer-readable storage medium as recited in claim 6, wherein the object is a different avatar.

8. The non-transitory computer-readable storage medium as recited in claim 6, wherein the instructions further cause the one or more computing devices to:

create or initiate animation of the object, the animation of the object associated with an animated gesture associated with the object in the virtual environment.

9. The non-transitory computer-readable storage medium as recited in claim 6, wherein the instructions further cause the one or more computing devices to:

generate a signal for an external device to cause the external device to at least temporarily perform an operation coordinated with playback of an animated gesture associated with the object in the virtual environment.

10. The non-transitory computer-readable storage medium as recited in claim 6, wherein the instructions further cause the one or more computing devices to:

determine first words in the text as being associated with the avatar;

determine second words in the text as being associated with a different avatar;

create at least first metadata in the speech markup data to indicate that the first words are associated with the avatar; and create at least second metadata in the speech markup data to indicate that the second words are associated with the different avatar.

11. The non-transitory computer-readable storage medium as recited in claim 6, wherein the metadata includes an offset value to create a spatial offset from the location of the object in the virtual environment.

12. The non-transitory computer-readable storage medium as recited in claim 6, wherein the instructions further cause the one or more computing devices to:

associate the object and a different object as a group of objects, wherein the tag is associated with the group of objects.

13. The non-transitory computer-readable storage medium as recited in claim 6, wherein the metadata includes a point in a coordinate system as the location of the object in the virtual environment.

14. A computer-implemented method comprising:

determining a tag associated with an object located in a virtual environment;

determining text to be spoken during animation of an avatar rendered within the virtual environment;

determining that a word in the text is associated with the tag of the object;

generating speech markup data based at least in part on the text, the speech markup data including an identifier of the object in association with the word;

determining audio data and one or more phonics for one or more words in the text including the word;

determining, based at least in part on the one or more phonics, one or more animations of the avatar, the one or more animations including animation of one or more facial features synchronized with playback of the audio data;

determining a location of the object in the virtual environment; and generating the one or more animations of the avatar based at least in part on the speech markup data and the identifier of the object to depict the avatar speaking the text at a time associated with output of the text and performing a gesture toward the location of the object in the virtual environment.

15. The computer-implemented method as recited in claim 14, further comprising generating an object animation associated with the object, the object animation depicting a change in a state or a position of the object in the virtual environment.

16. The computer-implemented method as recited in claim 14, wherein the object is a different avatar, and wherein generating the one or more animations includes generating an animation to depict the avatar looking at the different avatar in the virtual environment.

17. The computer-implemented method as recited in claim 14, further comprising associating the object and a different object as a group of objects, and wherein the tag is associated with the group of objects.

18. The computer-implemented method as recited in claim 14, further comprising generating a signal for an external device to cause the external device to perform an operation coordinated with playback of the gesture toward the object.

19. The computer-implemented method as recited in claim 14, wherein the speech markup data includes at least one or more phonic symbols associated with the one or more phonics and one or more time codes associated with the avatar, the one or more time codes indicating a time of occurrence of the one or more phonic symbols and the one or more words during playback of the audio data, and wherein generating the one or more animations is based at least in part on the one or more phonic symbols and the one or more time codes.

20. The computer-implemented method as recited in claim 14, further comprising:

determining first words in the text as being associated with the avatar;

determining second words in the text as being associated with a different avatar;

creating first metadata in the speech markup data to indicate that the first words are associated with the avatar; and creating second metadata in the speech markup data to indicate that the second words are associated with the different avatar, wherein at least one of the first metadata or the second metadata includes an offset value to create a spatial offset from the location of the object in the virtual environment.

* * * * *